United States Patent
Matsushita et al.

(10) Patent No.: US 10,826,112 B2
(45) Date of Patent: Nov. 3, 2020

(54) NEGATIVE ELECTRODE ACTIVE MATERIAL, NEGATIVE ELECTRODE FOR SECONDARY BATTERY, AND LITHIUM ION SECONDARY BATTERY

(71) Applicant: MURATA MANUFACTURING CO., LTD., Kyoto (JP)

(72) Inventors: Tadashi Matsushita, Kyoto (JP); Masaki Kuratsuka, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 301 days.

(21) Appl. No.: 15/974,890

(22) Filed: May 9, 2018

(65) Prior Publication Data
US 2018/0316054 A1 Nov. 1, 2018

Related U.S. Application Data

(63) Continuation of application No. PCT/JP2016/076162, filed on Sep. 6, 2016.

(30) Foreign Application Priority Data

Nov. 10, 2015 (JP) .................................. 2015-220244

(51) Int. Cl.
*H01M 10/0525* (2010.01)
*H01M 4/583* (2010.01)
(Continued)

(52) U.S. Cl.
CPC ..... *H01M 10/0525* (2013.01); *H01M 2/1626* (2013.01); *H01M 2/26* (2013.01);
(Continued)

(58) Field of Classification Search
None
See application file for complete search history.

(56) References Cited

U.S. PATENT DOCUMENTS 8,268,484 B2* 9/2012 Okazaki .................. H01M 4/04
427/58
2012/0107684 A1* 5/2012 Iwamoto ............... H01M 4/366
429/211
(Continued)

FOREIGN PATENT DOCUMENTS

CN 102956877 3/2013
CN 103682359 3/2014
(Continued)

OTHER PUBLICATIONS

International Search Report and Written Opinion issued in connection with International Patent Application No. PCT/JP2016/076162 dated Dec. 22, 2016. (5 pages).

*Primary Examiner* — Amanda J Barrow
(74) *Attorney, Agent, or Firm* — K&L Gates LLP

(57) ABSTRACT

A negative electrode active material includes a carbon material; a plurality of first particles including a first silicon oxide particle and a carbon layer and a plurality of second particles including a carbon particle and a second silicon oxide particle, and when a first mass of the first silicon oxide particle per gram of the negative electrode active material is referred to as $M_1$ gram, and a second mass of the second silicon oxide particle per gram of the negative electrode active material is referred to as $M_2$ grams, $0.40 \leq M_1/(M_1+M_2) \leq 0.85$ is satisfied, and when a first discharge capacity associated with the carbon material and the carbon particle is referred to as $Cp_C$, and a second discharge capacity associated with the first silicon oxide particle and the second silicon oxide particle is referred to as $Cp_{SO}$, $0.15 \leq Cp_{SO}/(Cp_C+Cp_{SO}) \leq 0.5$ is satisfied.

16 Claims, 8 Drawing Sheets

(51) Int. Cl.
*H01M 4/525* (2010.01)
*H01M 4/505* (2010.01)
*H01M 4/485* (2010.01)
*H01M 4/66* (2006.01)
*H01M 4/62* (2006.01)
*H01M 2/16* (2006.01)
*H01M 2/26* (2006.01)
*H01M 10/0587* (2010.01)
*H01M 4/587* (2010.01)
*H01M 4/36* (2006.01)
*H01M 4/131* (2010.01)
*H01M 4/133* (2010.01)
*H01M 4/02* (2006.01)

(52) U.S. Cl.
CPC ........... *H01M 4/131* (2013.01); *H01M 4/133* (2013.01); *H01M 4/364* (2013.01); *H01M 4/366* (2013.01); *H01M 4/485* (2013.01); *H01M 4/505* (2013.01); *H01M 4/525* (2013.01); *H01M 4/583* (2013.01); *H01M 4/587* (2013.01); *H01M 4/623* (2013.01); *H01M 4/625* (2013.01); *H01M 4/661* (2013.01); *H01M 10/0587* (2013.01); *H01M 2004/027* (2013.01); *H01M 2004/028* (2013.01); *H01M 2220/20* (2013.01); *Y02E 60/10* (2013.01); *Y02T 10/70* (2013.01)

(56) References Cited

U.S. PATENT DOCUMENTS

| | | | |
|---|---|---|---|
| 2013/0045419 A1* | 2/2013 | Chun | H01M 4/1395 429/217 |
| 2015/0099187 A1* | 4/2015 | Cui | H01M 10/052 429/231.8 |
| 2015/0270540 A1* | 9/2015 | Kouzu | H01M 4/134 429/218.1 |
| 2015/0380728 A1* | 12/2015 | Son | F21K 2/08 252/502 |
| 2016/0118655 A1 | 4/2016 | Yoshikawa et al. | |
| 2016/0218357 A1 | 7/2016 | Yoshikawa et al. | |
| 2017/0125806 A1* | 5/2017 | Wang | H01M 4/587 |
| 2018/0013136 A1* | 1/2018 | Mizuno | H01M 4/366 |

FOREIGN PATENT DOCUMENTS

| | | |
|---|---|---|
| JP | 2002-352797 A | 12/2002 |
| JP | 2014-229583 A | 12/2014 |
| JP | 2015-046221 A | 3/2015 |
| JP | 2015-072809 A | 4/2015 |
| JP | 2015-106563 A | 6/2015 |
| JP | 2015106563 | 6/2015 |
| WO | 2014/095823 | 6/2014 |

\* cited by examiner

NEGATIVE ELECTRODE ACTIVE MATERIAL, NEGATIVE ELECTRODE FOR SECONDARY BATTERY, AND LITHIUM ION SECONDARY BATTERY

CROSS REFERENCE TO RELATED APPLICATIONS

The present application is a continuation of PCT patent application no. PCT/JP2016/076162, filed on Sep. 6, 2016, which claims priority to Japanese patent application no. JP2015-220244 filed on Nov. 10, 2015, the entire contents of which are being incorporated herein by reference.

BACKGROUND

The present disclosure generally relates to a negative electrode active material, a negative electrode for a secondary battery, including the negative electrode active material, and a lithium ion secondary battery including the negative electrode.

Secondary batteries that use nonaqueous electrolytic solutions, above all, lithium ion secondary batteries, can achieve large energy densities as compared with lead batteries and nickel cadmium batteries which serve as secondary batteries with conventional aqueous electrolytic solutions, and thus have a high degree of expectation, and also have remarkable market growth. In particular, in recent years, features of lithium ion secondary batteries such as lightweight and high energy density are suitable for applications to electric cars and hybrid electric cars, and studies have been thus actively carried out which aim at increasing the sizes, capacities, and outputs of lithium ion secondary batteries. However, in lithium ion secondary batteries aiming particularly at increasing the capacities, the negative electrodes composed only of a carbon material lead to insufficient negative electrode capacities. Therefore, there is a need to use a non-carbon material such as silicon or silicon oxide in combination with a carbon material.

SUMMARY

The present disclosure generally relates to a negative electrode active material, a negative electrode for a secondary battery, including the negative electrode active material, and a lithium ion secondary battery including the negative electrode.

A negative electrode for a secondary battery according to an embodiment of the present disclosure is provided. The negative electrode for a secondary battery includes a negative electrode active material, where the negative electrode active material includes a mixture of a carbon material, a plurality of first particles, and a plurality of second particles, where the first particles include a first silicon oxide particle, and a carbon layer that covers the surface of the first silicon oxide particle, where the second particles include a carbon particle and a second silicon oxide particle, where when a first mass of the first silicon oxide particles per gram of the negative electrode active material is referred to as $M_1$ gram, and a second mass of the second silicon oxide particles per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

where when a first discharge capacity associated with the carbon material and the carbon particle of the second particle is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

A lithium ion secondary battery according to another embodiment of the present disclosure is provided. The lithium ion secondary battery including:

a negative electrode including a negative electrode active material;

a positive electrode;

a separator that isolates the negative electrode from the positive electrode; and a nonaqueous electrolytic solution, where the negative electrode active material includes the negative electrode active material in the negative electrode for a secondary battery according to the embodiment as described herein.

A negative electrode active material of a negative electrode for a secondary battery according to another embodiment of the present disclosure is provided. The negative electrode active material includes a mixture of a carbon material, a plurality of first particles, and a plurality of second particles, wherein the first particles include a first silicon oxide particle and a carbon layer covering a surface of the first silicon oxide particle, wherein the second particles include a carbon particle and a second silicon oxide particle, wherein when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

wherein when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

In the negative electrode for a secondary battery according to an embodiment of the present disclosure, the negative electrode active material according to another embodiment of the present disclosure, and the negative electrode of the lithium ion secondary battery according to an embodiment of the present disclosure (hereinafter, collectively referred to as "a negative electrode or the like for a secondary battery according to an embodiment of the present disclosure"), the negative electrode active material includes two kinds of particles: the first particles and the second particles, which have a defined mass ratio between the first silicon oxide particles and the second silicon oxide particles, and a defined relationship between the discharge capacities $Cp_C$ and $Cp_{SO}$, thus making it possible to maintain great charge/discharge cycle characteristics over a long charge/discharge cycle period. It should be understood that the present technology is not limited to enhancing charge/discharge cycle characteristics over a long charge/discharge cycle period and that other suitable properties relating to the present technology may be realized and as further described herein.

DETAILED DESCRIPTION

Figure 1:
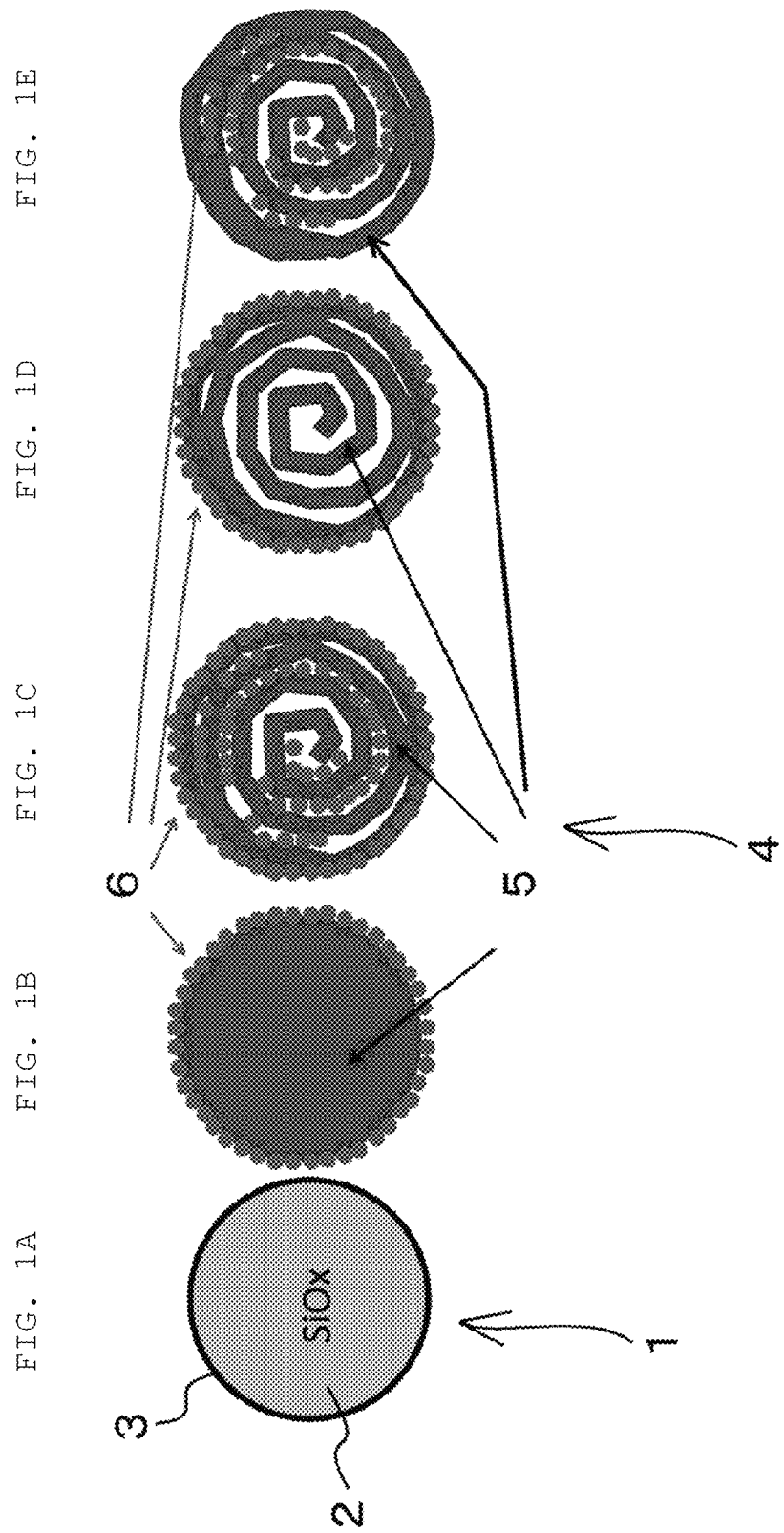
FIG. 1A is a conceptual diagram of a first particle constituting a negative electrode active material in the present disclosure.
FIGS. 1B, 1C, 1D, and 1E are conceptual diagrams of second particles constituting the negative electrode active material according to an embodiment.

The present disclosure generally relates to a negative electrode active material, a negative electrode for a secondary battery, including the negative electrode active material, and a lithium ion secondary battery including the negative electrode. As described herein, the present disclosure will be described based on examples with reference to the drawings, but the present disclosure is not to be considered limited to the examples, and various numerical values and materials in the examples are considered by way of example.

In a negative electrode or the like for a secondary battery according to an embodiment of the present disclosure, first silicon oxide particles can be configured to include $SiO_X$ (where $X \leq 2.5$, specifically, for example, $0.3 \leq X \leq 2.5$), and second silicon oxide particles can be configured to include $SiO_Y$ (where $Y \leq 2.5$, specifically, for example, $0.3 \leq Y \leq 2.5$).

In the negative electrode or the like for a secondary battery according to an embodiment of the present disclosure, the particle size of the first silicon oxide particle in the major axis direction can be configured to be $1 \times 10^{-6}$ m to $1.5 \times 10^{-5}$ m. When the particle size of the first silicon oxide particle in the major axis direction exceeds $1.5 \times 10^{-5}$ m, there is a possibility that the expansion and shrinkage of the first silicon oxide particle during a charge/discharge cycle will be increased, thereby isolating the first particles during a charge/discharge cycle, and thus causing a decrease in capacity. In addition, the reason why the particle size is defined to be $1 \times 10^{-6}$ m or more is that when silicon oxide particles as a bulk body are subjected to grinding to less than $1 \times 10^{-6}$ m, there is a possibility that the crystallinity of the silicon oxide particles will be decreased, thereby resulting in an inability to elicit the performance of the silicon oxide particles themselves.

Furthermore, in the negative electrode or the like for a secondary battery according to an embodiment of the present disclosure, the carbon particles of the second particles can be configured to include natural graphite, and in this case, the particle size of the second silicon oxide particle in the major axis direction can be configured to be $3 \times 10^{-8}$ m to $1 \times 10^{-6}$ m, and the particle size of the second particle can be configured to be $5 \times 10^{-6}$ m to $5 \times 10^{-5}$ m. Examples of the natural graphite can include scaly graphite and lumpy graphite, and natural graphite subjected to pitch coating treatment.

The various particle sizes can be determined, for example, based on cross-section SEM observation. Further, the values of $M_1$ and $M_2$ can be determined on the basis of analysis of a cross section of the negative electrode on silicon element and oxygen element by energy dispersive X-ray spectroscopy (EDX, Energy Dispersive X-ray Spectroscopy).

Alternatively, in the negative electrode or the like for a secondary battery according to an embodiment of the present disclosure, the carbon particles constituting the second particles can be configured to include non-graphitizable carbon, or the carbon particles constituting the second particles can be configured to be composed of a spherical carbon material or a spheroidized scaly carbon material. Further, in these cases, the second silicon oxide particles can be configured to be disposed on the surfaces of the carbon particles constituting the second particles, the particle size of the second silicon oxide particle in the major axis direction can be configured to be $3 \times 10^{-8}$ m to $1 \times 10^{-6}$ m, and the particle size of the second particle can be configured to be $5 \times 10^{-6}$ m to $5 \times 10^{-5}$ m. When the particle size of the second silicon oxide particle exceeds $1 \times 10^{-6}$ m, it may be difficult to form a composite of the second silicon oxide particles and the carbon particles. In addition, there is a possibility of leading to an inability to maintain the shapes of the second particles due to the expansion and shrinkage of the second silicon oxide particles during charge/discharge cycles. On the other hand, it is difficult to produce second silicon oxide particles of less than $3\times10^{-8}$ m in particle size, and it is difficult to produce second particles of less than $5\times10^{-6}$ m in particle size. On the other hand, when the particle size of the second particle exceeds $5\times10^{-5}$ m, there is a possibility that the charge/discharge performance as a negative electrode active material will be decreased. Examples of the non-graphitizable carbon can include coke such as pitch coke, needle coke, petroleum coke, and artificial graphite. The second particles may be obtained by forming a composite of the carbon particles and the second silicon oxide particles, and then coating, with pitch, the surfaces of the particles obtained by the formation of the composite, or the second particles may be obtained by coating the surfaces of the second silicon oxide particles with pitch, and then forming a composite of the carbon particles and the second silicon oxide particles coated with the pitch.

The discharge capacity $Cp_C$ associated with the carbon material and the carbon particles and the discharge capacity $Cp_{SO}$ associated with the first silicon oxide particles and the second silicon oxide particles can be determined by the following method. More specifically, the lithium ion secondary battery is discharged to 2.8 volts or less, and then disassembled, the negative electrode active material layer is peeled off from one side of the negative electrode current collector, and with the use of this negative electrode, a test coin battery with lithium as a counter electrode is assembled. Then, in the case of charging and discharging at a rate of 0.1 C, in the discharge curve of discharging from 0 volts to 1.5 volts, the discharge capacity from 1.5 volts to 0.24 volts is referred to as $Cp_{SO}$, and the discharge capacity from 0.24 volts to 0 volts is referred to as $Cp_C$. Alternatively, in the discharge curve of discharging at the 0.1 C rate, with an inflection point around 0.24 volts in the case of obtaining the dQ/dV curve as a boundary, the discharge capacity at or below the voltage corresponding to the inflection point may be referred to as $Cp_C$, and the discharge capacity at or above the voltage corresponding to the inflection point may be referred to as $Cp_{SO}$. Further, as mentioned above, the value of the discharge capacity ($Cp_C+Cp_{SO}$) is, for example, the discharge capacity of discharging from 0 volts to 1.5 volts in the case of charging and discharging at a rate of 0.1 C with lithium as a counter electrode.

In an embodiment, examples of the carbon material constituting the negative electrode active material can include natural graphite and artificial graphite, and natural graphite subjected to pitch coating treatment. In addition, the shape of the carbon material may be any of fibrous, spherical, granular and scaly.

The first silicon oxide particles constituting the first particles can be produced by a well-known method, and the second silicon oxide particles constituting the second particles can be obtained by grinding the first silicon oxide particles. Alternatively, in an embodiment, the second silicon oxide particles can be also obtained by oxidizing fine silicon particles.

Further, the first particles can be obtained by covering the surfaces of the first silicon oxide particles with a carbon layer, and specifically, produced, for example, based on carbonization treatment such as pitch coating treatment, carbon sputtering, and organic matter pyrolysis. Covering the surfaces of the first silicon oxide particles with a carbon layer can impart electron conductivity according to an embodiment.

The second particles can be produced, for example, by sufficiently mixing a dispersion of scaly graphite and a dispersion of the second silicon oxide particles subjected to grinding to the order of nanometers, drying the mixture, and then performing a spheronization process or treatment to the mixture thereof. Alternatively, the second particles can be also produced from a dispersion of spheroidized graphite and a dispersion of the second silicon oxide particles subjected to grinding to the order of nanometers. Further, electrical conductivity can be imparted to the second silicon oxide particles by performing the spheronization treatment, and then performing the pitch coating treatment.

The constituent elements of a lithium ion secondary battery will be described below in the case of adopting the secondary battery as a lithium secondary battery (lithium ion secondary battery) that acquires the capacity of the negative electrode by occlusion/release of lithium as an electrode reactant.

In the lithium ion secondary battery, a positive electrode active material can be configured to include lithium atoms. For a positive electrode, a positive electrode active material layer is formed on one side or both sides of a positive electrode current collector. Examples of a material constituting the positive electrode current collector can include, for example, copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and palladium (Pd), alloys containing any of the foregoing, and conductive materials such as stainless steel. The positive electrode active material layer includes, as a positive electrode active material, a positive electrode material capable of occluding and releasing lithium. The positive electrode active material layer may further include a positive electrode binder, a positive electrode conducting agent, and the like. Examples of the positive electrode material can include lithium-containing compounds (compounds containing a lithium atom), and from the viewpoint of acquiring a high energy density, it is preferable to use a lithium-containing composite oxide or a lithium-containing phosphate compound. The lithium-containing composite oxide refers to an oxide containing lithium and one or more elements (hereinafter referred to as "other elements", provided that lithium is excluded) as constituent elements, and has a layered rock-salt crystal structure or a spinel-type crystal structure. Specifically, examples of the oxide can include, for example, lithium-cobalt based materials, lithium-nickel based materials, spinel manganese based materials, and superlattice structural materials. Alternatively, the lithium-containing phosphate compound refers to a phosphate compound containing lithium and one or more elements (other elements) as constituent elements, and has an olivine-type crystal structure.

For the negative electrode, a negative electrode active material layer is formed on one side or both sides of a negative electrode current collector. The negative electrode active material layer includes the above-described negative electrode active material according to the present disclosure, capable of occluding and releasing lithium. The negative electrode active material layer may further include a negative electrode binder, a negative electrode conducting agent, and the like. The negative electrode binder and the negative electrode conducting agent can be adapted in the same manner as the positive electrode binder and the positive electrode conducting agent. Examples of a material constituting the negative electrode current collector can include copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), and palladium (Pd), alloys containing any of the foregoing, and conductive materials such as stainless steel. From the viewpoint of improving the adhesion of the negative electrode active material layer to the negative electrode current collector based on a so-called anchor effect, the surface of the negative electrode current collector is preferably roughened. In this case, at least the surface of a region of the negative electrode current collector where the negative electrode active material layer is to be formed has only to be roughened. Methods for the roughening can include, for example, a method of forming fine particles through the use of electrolytic treatment. The electrolytic treatment refers to a method of providing the surface of the negative electrode current collector with irregularities by forming fine particles on the surface of the negative electrode current collector through the use of an electrolytic method in an electrolytic cell.

The negative electrode active material layer can be formed, for example, by a coating method according to an embodiment. More specifically, the layer can be formed on the basis of a method of mixing a mixture of a carbon material, the plurality of first particles, and the plurality of second particles with a negative electrode binder or the like, then dispersing the mixture in a solvent such as water or an organic solvent to prepare a negative electrode mixture slurry, and coating the negative electrode current collector with the slurry.

Specifically, examples of the binders in the positive electrode and the negative electrode can include polymer materials, e.g., synthetic rubbers such as styrene butadiene rubbers, fluorine-based rubbers, and ethylene propylene diene; and fluorine-based resins such as polyvinylidene fluoride, polyvinyl fluoride, polyimide, and polytetrafluoroethylene. In addition, examples of the conducting agent in the positive electrode can include carbon materials such as graphite, carbon black, graphite, acetylene black, and Ketjen black, but any material such as a metallic material and a conductive polymer can be used as long as the material has electrical conductivity.

In order to prevent lithium from being unintentionally deposited on the negative electrode in the course of charging, the chargeable capacity of the negative electrode is preferably higher than the charge capacity of the positive electrode. More specifically, the electrochemical equivalent of the negative electrode capable of occluding/releasing lithium is preferably larger than the electrochemical equivalent of the positive electrode. It is to be noted that the lithium deposited on the negative electrode is, for example, a lithium metal when the electrode reactant is lithium.

Based on a spot welding method or an ultrasonic welding method, a positive electrode lead part can be attached to the positive electrode current collector. The positive electrode lead part is desirably net-like metal foil, but there is no need for the part to be a metal as long as the part is electrochemically and chemically stable and capable of achieving electrical continuity. Examples of the material for the positive electrode lead part can include, for example, aluminum (Al).

Based on a spot welding method or an ultrasonic welding method, a negative electrode lead part can be attached to the negative electrode current collector. The negative electrode lead part is desirably net-like metal foil, but there is no need for the part to be a metal as long as the part is electrochemically and chemically stable and capable of achieving electrical continuity. Examples of the material for the negative electrode lead part can include, for example, copper (Cu) and nickel (Ni).

A separator is intended to separate the positive electrode and the negative electrode to allow passage of lithium ions while preventing a short circuit due to the current caused by the contact between the positive electrode and the negative electrode. The separator is composed of, for example, a porous membrane made from a synthetic resin such as polyolefin resins (polypropylene resins and polyethylene resins), polyimide resins, polytetrafluoroethylene resins, polyvinylidene fluoride resins, polyphenylene sulfide resins, and aromatic polyamide; a porous membrane such as ceramics; a glass fiber; a nonwoven fabric made from a liquid crystal polyester fiber, an aromatic polyamide fiber, or a cellulosic fiber, a ceramic nonwoven fabric, or the like, and above all, porous films of polypropylene and polyethylene are preferred. Alternatively, the separator can be also composed of a laminated film with two or more kinds of porous membranes laminated, or can be a separator coated with an inorganic substance layer, or an inorganic substance-containing separator. The thickness of the separator is preferably 5 μm or more and 50 μm or less, more preferably 7 μm or more and 30 μm or less. When the separator is excessively thick, the filling amounts of the active materials will be decreased, thereby decreasing the battery capacity, and the ionic conductivity will be decreased, thereby degrading the current characteristics. Conversely, when the separator is excessively thin, the mechanical strength of the separator will be decreased.

Examples of a lithium salt constituting a nonaqueous electrolytic solution suitable for use in the lithium ion secondary battery can include, but not limited thereto, $LiPF_6$, $LiClO_4$, $LiBF_4$, $LiAsF_6$, $LiSbF_6$, $LiTaF_6$, $LiNbF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $½Li_2B_{12}F_{12}$, $Li_2SiF_6$, LiCl, LiBr, and LiI. In addition, examples of the organic solvent can include cyclic carbonates such as ethylene carbonate (EC), propylene carbonate (PC) and butylene carbonate (BC); chain carbonates such as dimethyl carbonate (DMC), ethyl methyl carbonate (EMC), diethyl carbonate (DEC), dipropyl carbonate (DPC), propyl methyl carbonate (PMC), and propyl ethyl carbonate (PEC); cyclic ethers such as tetrahydrofuran (THF), 2-methyltetrahydrofuran (2-MeTHF), 1,3 dioxolane (DOL), and 4-methyl-1,3 dioxolane (4-MeDOL); chain ethers such as 1,2 dimethoxyethane (DME) and 1,2 diethoxyethane (DEE); cyclic esters such as γ-butyrolactone (GBL) and γ-valerolactone (GVL); and chain esters such as methyl acetate, ethyl acetate, propyl acetate, methyl formate, ethyl formate, propyl formate, methyl butyrate, methyl propionate, ethyl propionate, and propyl propionate. Alternatively, examples of the organic solvent can include tetrahydropyran, 1,3 dioxane, 1,4 dioxane, N,N-dimethylformamide (DMF), N,N-dimethylacetamide (DMA), N-methylpyrrolidinone (NMP), N-methyloxazolidinone (NMO), N,N'-dimethylimidazolidinone (DMI), dimethylsulfoxide (DMSO), trimethyl phosphate (TMP), nitromethane, (NM), nitroethane (NE), sulfolane (SL), methylsulfolane, acetonitrile (AN), anisole, propionitrile, glutaronitrile (GLN), adiponitrile (ADN), methoxyacetonitrile (MAN), 3-methoxypropionitrile (MPN), and diethyl ether. Alternatively, an ionic liquid can be also used. As the ionic liquid, a conventionally known ionic liquid can be used, and may be selected as necessary.

The electrolyte constituting the nonaqueous electrolytic solution can be a liquid electrolyte or a gel-like electrolyte. More specifically, the electrolyte layer can be composed of the nonaqueous electrolytic solution and a holding polymer compound. The nonaqueous electrolytic solution is held, for example, by a holding polymer compound. The thus configured electrolyte layer is a gel-like electrolyte, which achieves a high ion conductivity (for example, 1 mS/cm or more at room temperature), and prevents liquid leakage of the nonaqueous electrolytic solution.

Specifically, examples of the holding polymer compound can include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVF), polychlorotrifluoroethylene (PCTFE), perfluoroalkoxy fluorine resin (PFA), tetrafluoroethylene-hexafluoropropylene copolymer (FEP), ethylenetetrafluoroethylene copolymer (ETFE), ethylene-chlorotrifluoroethylene copolymer (ECTFE), polyvinyl acetate, polyvinyl alcohol, polymethyl methacrylate, polyacrylic acid, polymethacrylic acid, styrene-butadiene rubbers, nitrile-butadiene rubbers, polystyrene, polycarbonate, and vinyl chloride. These compounds may be used alone or in mixture. In addition, the holding polymer compound may be a copolymer. Specifically, examples of the copolymer can include a copolymer of vinylidene fluoride and hexafluoropyrene, and above all, from the viewpoint of electrochemical stability, polyvinylidene fluoride is preferred as a homopolymer, and a copolymer of vinylidene fluoride and hexafluoropyrene is preferred as a copolymer. Further, high heat-resistant compounds such as $Al_2O_3$, $SiO_2$, $TiO_2$, and BN (boron nitride may be included as a filler.

In the lithium ion secondary battery, the electrolyte can be configured to include a gel-like electrolyte as just described, but is not limited thereto. In the case of a lithium ion secondary battery using a liquid electrolyte, the negative electrode and the separator may slide relatively in a relatively free manner, and the positive electrode and the separator may slide relatively in a relatively free manner. Further, in such a case, it may be hard for the lithium ion secondary battery to undergo warpage due to the expansion of the negative electrode active material. On the other hand, in the case of a gel-like electrolyte, a continuous coating process can be adopted without requiring a process for vacuum injection of a nonaqueous electrolytic solution, and an advantage in terms of productivity is thus considered to be provided in manufacturing a large-area lithium ion secondary battery.

Examples of the shape or form of the lithium ion secondary battery can include coin types, button types, plate types, square types, cylindrical types, and laminate types (laminate film types).

Alternatively, examples of an embodiment of the lithium ion secondary battery can include a structure where an inorganic insulating film is formed on a substrate, and a positive electrode current collector with a positive electrode active material layer formed, a separator containing an organic electrolytic solution (nonaqueous electrolytic solution), and a negative electrode current collector with a negative electrode active material layer formed are stacked on the inorganic insulating film. Examples of the substrate in the case of such a structure can include, for example, a polycarbonate (PC) resin substrate, a fluorine resin substrate, a polyethylene terephthalate (PET) substrate, a polybutylene terephthalate (PBT) substrate, a polyimide (PI) substrate, a polyamide (PA) substrate, a polysulfone (PSF) substrate, a polyether sulfone (PES) substrate, a polyphenylene sulfide (PPS) substrate, a polyether ether ketone (PEEK) substrate, a polyethylene naphthalate (PEN), and a cycloolefin polymer (COP). In addition, the material constituting the inorganic insulating film may be any material as long as the material can form an insulating film with low hygroscopicity and with moisture resistance, and examples of the material can include single oxides or nitrides or sulfides of Si, Cr, Zr, Al, Ta, Ti, Mn, Mg, and Zn, or mixtures thereof. More specifically, the examples can include $Si_3N_4$, $SiO_2$, $Cr_2O_3$, $ZrO_2$, $Al_2O_3$, $Ta_2O_5$, $TiO_2$, $Mn_2O_3$, MgO, and ZnS, or mixtures thereof.

Examples of a material for a wound electrode body housing member (battery can) constituting a cylindrical secondary battery can include iron (Fe), nickel (Ni), aluminum (Al), and titanium (Ti), or alloys thereof, and stainless steel (SUS). The battery can is preferably plated, for example, with nickel or the like in order to prevent electrochemical corrosion associated with secondary battery charging/discharging.

In the case of a laminate-type (laminate film-type) lithium ion secondary battery, an exterior member is preferably configured to have a laminated structure of a plastic material layer (fusion layer), a metal layer, and a plastic material layer (surface protective layer), that is, configured to be a laminate film. Then, for example, the exterior member is folded so that the fusion layers are opposed to each other with a wound electrode body interposed therebetween, and then outer circumferential edges of the fusion layers are subjected to fusion bonding to each other. However, the exterior member may have two laminate films bonded to each other with an adhesive or the like interposed therebetween. The fusion layer includes, for example, a film of an olefin resin such as polyethylene, polypropylene, modified polyethylene, modified polypropylene, or a polymer thereof. The metal layer includes, for example, aluminum foil, stainless steel foil, nickel foil, or the like. The surface protective layer includes, for example, nylon, polyethylene terephthalate or the like. Above all, the exterior member is preferably an aluminum laminate film of a polyethylene film, an aluminum foil, and a nylon film laminated in this order. However, the exterior member may be a laminate film that has another laminated structure, a polymer film such as polypropylene, or a metallic film.

The secondary battery according to an embodiment of the present disclosure, including the lithium ion secondary battery, can be used as a driving power supply or an auxiliary power supply for, for example, a notebook type personal computer, a PDA (portable information terminal), a cellular phone, a smartphone, a base unit or a slave unit for a cordless telephone, a video movie, a digital still camera, an electronic book, an electronic dictionary, a portable music player, a radio, a headphone, a game machine, a navigation system, a memory card, a cardiac pacemaker, a hearing aid, a power tool, an electric shaver, a refrigerator, an air conditioner, a television receiver, a stereo, a water heater, a microwave oven, a dishwasher, a washing machine, a dryer, a lighting device, a toy, a medical device, a robot, a road conditioner, a traffic light, a rail vehicle, a golf cart, an electric cart, an electric car (including hybrid car), or the like. In addition, the secondary battery can be mounted on a building such as a house or a power-storage power supply for a power generation facility, or the like, or can be used for supplying power to the building and the power supply. In the electric car, a conversion device that is supplied with electric power to convert the electric power to a driving force is generally a motor. Control devices that perform information processing related to vehicle control includes a control device that displays the remaining level of the secondary battery, based on information on the remaining level of the secondary battery. In addition, the secondary battery can be also used in an electric storage device in a so-called smart grid. Such an electric storage device can not only supply electric power, but also store electricity by being supplied with electric power from another electric power source. For example, thermal power generation, nuclear power generation, hydroelectric power generation, solar cells, wind power generation, geothermal power generation, fuel cells (including biofuel cells), and the like can be used as another electric power source.

The lithium ion secondary battery according to an embodiment of the present disclosure can be applied to a secondary battery in a battery pack that has the secondary battery, a control means for control over the secondary battery, and an exterior including therein the secondary battery. In this battery pack, the control means controls, for example, charge/discharge, overdischarge or overcharge over the secondary battery. Alternatively, the lithium ion secondary battery according to an embodiment of the present disclosure can be applied to a secondary battery in a battery pack including the lithium ion secondary battery, a control unit for controlling the operation of the secondary battery, and a switch unit for switching the operation of the secondary battery in accordance with an instruction from the control unit. Also in this battery pack, the control means controls, for example, charge/discharge, overdischarge or overcharge over the secondary battery.

The lithium ion secondary battery according to an embodiment of the present disclosure can be applied to a secondary battery in an electronic device that receives power supply from the secondary battery. More specifically, this electronic device is an electronic device including the lithium ion secondary battery according to the present disclosure as a power supply source. Alternatively, the lithium ion secondary battery according to an embodiment of the present disclosure can be applied to a secondary battery in a power tool including the secondary battery and a movable part that is supplied with electric power from the secondary battery.

The disclosed lithium ion secondary battery according to an embodiment of the present disclosure can be applied to a secondary battery in an electric vehicle including a conversion device that is supplied with electric power from the secondary battery to convert the power to a driving force for the vehicle, and a control device that performs information processing related to vehicle control, based on information on the secondary battery. More specifically, the lithium ion secondary battery according to an embodiment of the present disclosure can be applied to a secondary battery in an electric vehicle including a conversion unit for converting electric power supplied from the secondary battery, to a driving force, a driving unit for driving in response to the driving force, and a control unit for controlling the operation of the secondary battery. In this electric vehicle, the conversion device typically receives power supply from the secondary battery to drive the motor, and thus generate a driving force. Regenerative energy can be also used for driving the motor. In addition, the control device performs information processing related to vehicle control, for example, based on the remaining level of the secondary battery. The electric vehicle includes, for example, electric car, electric motorbikes, electric bicycles, and rail vehicles, as well as so-called hybrid cars.

The lithium ion secondary battery according to an embodiment of the present disclosure can be applied to a secondary battery in an electric power system configured to receive power supply from the secondary battery and/or to supply electric power from an electric power source to the secondary battery. More specifically, the lithium ion secondary battery according to the present disclosure can be applied to a secondary battery in a power storage system including the secondary battery, one or more electric devices that are supplied with electric power from the secondary battery, and a control unit that controls the power supply to the electric devices from the secondary battery. This electric power system may be any power system, including mere electric power devices, so long as the system is intended to use generally electric power. This electric power system includes, for example, a smart grid, a household energy management system (HEMS), a vehicle, which are also capable of electricity storage.

The lithium ion secondary battery according to an embodiment of the present disclosure can be applied to a secondary battery in a power-storage power supply provided with a secondary battery, and configured to be connected to an electronic device that is supplied with electric power. Regardless of the application of the power-storage power supply, basically, the power supply can be used for any electric power system or electric power device, but, for example, can be used for smart grid.

Example 1 relates to a negative electrode active material, a negative electrode for a secondary battery, and a lithium ion secondary battery according to an embodiment of the present disclosure.

The negative electrode for a secondary battery according to Example 1 is a negative electrode for a secondary battery, including a negative electrode active material. Further, the negative electrode active material is composed of a mixture of a carbon material, a plurality of first particles and a plurality of second particles. FIG. 1A shows a conceptual diagram of the first particle, whereas FIG. 1B, FIG. 1C, FIG. 1D and FIG. 1E show conceptual diagrams of the second particle, and the first particle 1 includes a first silicon oxide particle 2 and a carbon layer 3 that covers the surface of the first silicon oxide particle 2, whereas the second particle 4 includes a carbon particle 5 and second silicon oxide particles 6. In this regard, the second silicon oxide particles 6 are disposed on the surface of the carbon particle 5 (see FIG. 1B and FIG. 1D), or in the layered space inside the carbon particle 5 (see FIG. 1E), or on the surface of the carbon particle and in the layered space inside the carbon particle (see FIG. 1C). Further, when a first mass of the first silicon oxide particles 2 per gram of the negative electrode active material is referred to as $M_1$ gram, and a second mass of the second silicon oxide particle 6 per gram of the negative electrode active material is referred to as $M_2$ gram, with:

$$M_1' \equiv M_1/(M_1+M_2), \text{ and}$$

$$M_2' \equiv M_2/(M_1+M_2),$$

the following:

$$0.40 \leq M_1'\{\equiv M_1/(M_1+M_2)\} \leq 0.85, \text{ and}$$

$$0.15 \leq M_2'\{\equiv M_2/(M_1+M_2)\} \leq 0.60,$$

preferably, $$0.50 \leq M_1' \leq 0.70, \text{ and}$$

$$0.30 \leq M_2' \leq 0.50$$

is satisfied, and when a first discharge capacity associated with the carbon material and the carbon particles of the second particles is referred to as $Cp_C$, and a second discharge capacity associated with the first silicon oxide particles of the first particles and the second silicon oxide particles constituting the second particles is referred to as $Cp_{SO}$, with:

$$Cp_C' = Cp_C/(Cp_C + Cp_{SO}), \text{ and}$$

$$Cp_{SO}' = Cp_{SO}/(Cp_C + Cp_{SO}),$$

the following:

$$0.5 \leq Cp_C' = \{Cp_C/(Cp_C+Cp_{SO})\} \leq 0.85, \text{ and}$$

$$0.15 \leq Cp_{SO}' = \{Cp_{SO}/(Cp_C+Cp_{SO})\} \leq 0.5,$$

preferably, $$0.60 \leq Cp_C' \leq 0.75, \text{ and}$$

$$0.25 \leq Cp_{SO}' \leq 0.40$$

is satisfied.

Further, the lithium ion secondary battery according to Example 1, in an embodiment, is a lithium ion secondary battery including:

a negative electrode including a negative electrode active material;

a positive electrode;

a separator that isolates the negative electrode from the positive electrode; and a nonaqueous electrolytic solution. Further, the negative electrode active material includes the negative electrode active material in the negative electrode for a secondary battery according to Example 1 as mentioned above.

Furthermore, the negative electrode active material constituting the negative electrode for a secondary battery according to Example 1 includes the negative electrode active material in the negative electrode for a secondary battery according to Example 1 as mentioned above.

In this regard, the first silicon oxide particles 2 include $SiO_X$ (where $X \leq 2.5$, specifically, for example, $0.3 \leq X \leq 2.5$), and the second silicon oxide particles 6 include $SiO_Y$ (where $Y \leq 2.5$, specifically, for example, $0.3 \leq Y \leq 2.5$). Specifically, for example, $X = 1.1$, and $Y = 1.1$.

In addition, the particle size of the first silicon oxide particle 2 in the major axis direction is $1 \times 10^{-6}$ m to $1.5 \times 10^{-5}$ m, specifically, 5 μm, for example. Furthermore, in Example 1, the carbon particles 5 constituting the second particles 4 include natural graphite, the particle size of the second silicon oxide particle 6 in the major axis direction is $3 \times 10^{-8}$ m to $1 \times 10^{-6}$ m, specifically, for example, 0.1 μm, and the particle size of the second particle is $5 \times 10^{-6}$ m to $5 \times 10^{-5}$ m, specifically, for example, 15 μm. The natural graphite includes scaly graphite or lumpy graphite. In addition, the carbon material specifically includes, for example, natural graphite, or natural graphite subjected to pitch coating treatment.

In accordance with Example 1, 98 parts by mass of a mixture of the carbon material, the first particles 1, and the second particles 4, 1 part by mass of SBR as a binder, and 1 part by mass of CMC were mixed with ion-exchange water as a solvent to prepare a negative electrode mixture slurry. Next, the negative electrode mixture slurry was uniformly applied to one surface of a negative electrode current collector made of copper foil of 10 μm in thickness, except for a part for the attachment of a negative electrode lead part, and dried, and furthermore, the slurry was uniformly applied to the other surface, except for a part for the attachment of a negative electrode lead part, and dried. Then, a negative electrode active material layer was formed by compression molding with the use of a roll press machine, so as to provide the negative electrode mixture layer with a predetermined density, thereby providing a negative electrode member. Finally, the pressed negative electrode member was slit to a predetermined width, and a negative electrode lead part made of nickel (Ni) foil was attached to the negative electrode current collector with an ultrasonic welding method, thereby providing a negative electrode.

On the other hand, 94 parts by mass of a positive electrode active material, 3 parts by mass of graphite as a conducting agent, and 3 parts by mass of polyvinylidene fluoride (PVDF) as a binder were mixed to prepare a positive electrode mixture. Then, this positive electrode mixture was mixed with N-methyl-2-pyrrolidone as a solvent to prepare a paste-like positive electrode mixture slurry. Next, the positive electrode mixture slurry was uniformly applied to one surface of a positive electrode current collector made of strip-shaped aluminum foil of 15 μm in thickness, except for a part for the attachment of a positive electrode lead part, and dried, and furthermore, the slurry was uniformly applied to the other surface, except for a part for the attachment of a positive electrode lead part, and dried. Then, a positive electrode active material layer was formed by compression molding with the use of a roll press machine, so as to provide the positive electrode mixture layer with a predetermined density, thereby providing a positive electrode member. Next, the pressed positive electrode member was slit to a predetermined width, a positive electrode lead portion made of aluminum (Al) foil of 100 μm in thickness was attached to the positive electrode current collector with an ultrasonic welding method, and the lead part of an intermediate blank part and the exposed part of the positive electrode current collector were covered with a PP tape, thereby providing a positive electrode. In addition, in this case, the positive electrode member at the beginning of winding and the end thereof was cut so that there was no uncoated part other than the uncoated part in the central part of the positive electrode member.

Used was a nonaqueous electrolytic solution including a mixed solvent obtained by mixing ethylene carbonate (EC), ethylmethyl carbonate (EMC), and dimethyl carbonate (DMC) at a volume ratio of 2:2:6 and lithium hexafluorophosphate ($LiPF_6$) as an electrolyte salt. The concentration of the lithium hexafluorophosphate ($LiPF_6$) in the nonaqueous electrolytic solution was adapted to be 1 mol/liter. In addition, a microporous polyethylene film of 16 μm in thickness was used as a separator.

Figure 2:
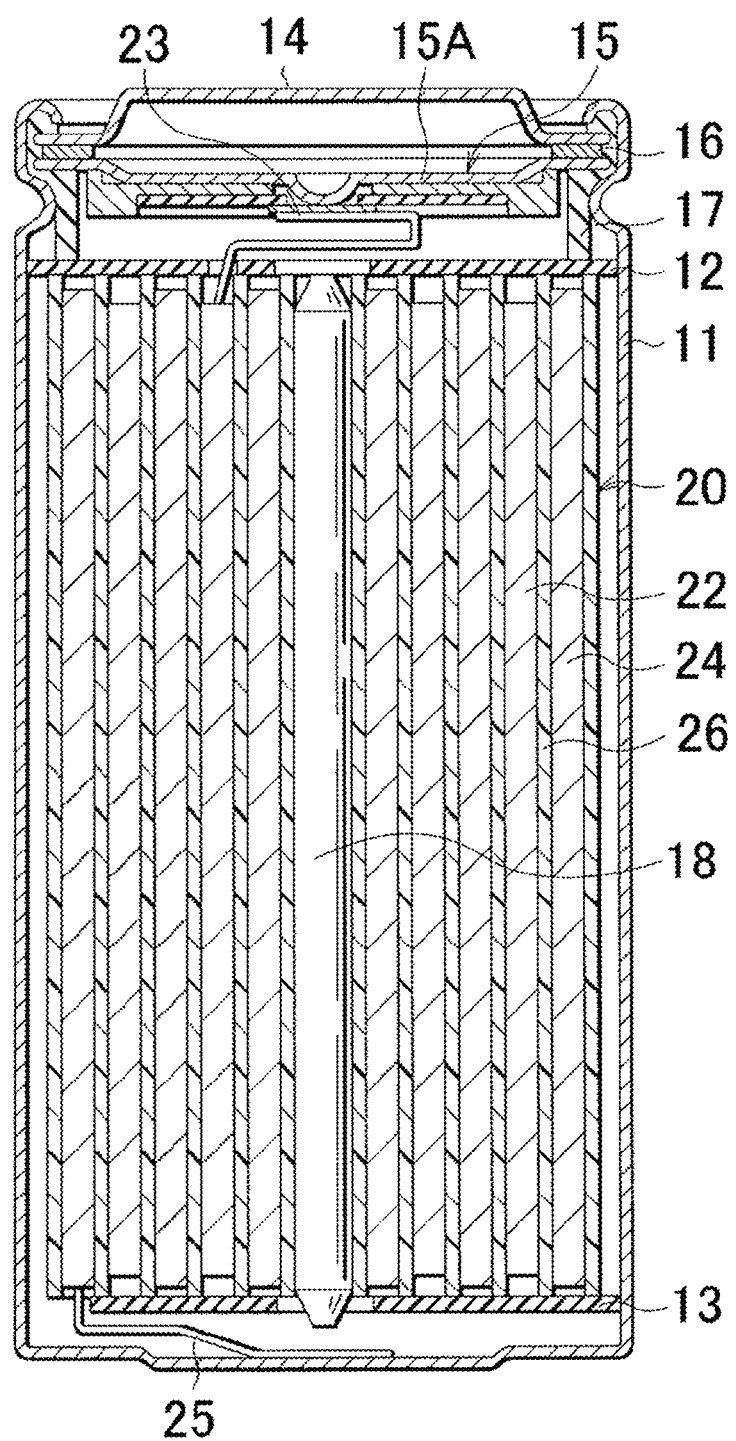
FIG. 2 is a schematic cross-sectional view of a cylindrical secondary battery (lithium ion secondary battery) according to an embodiment.
Figure 3A:
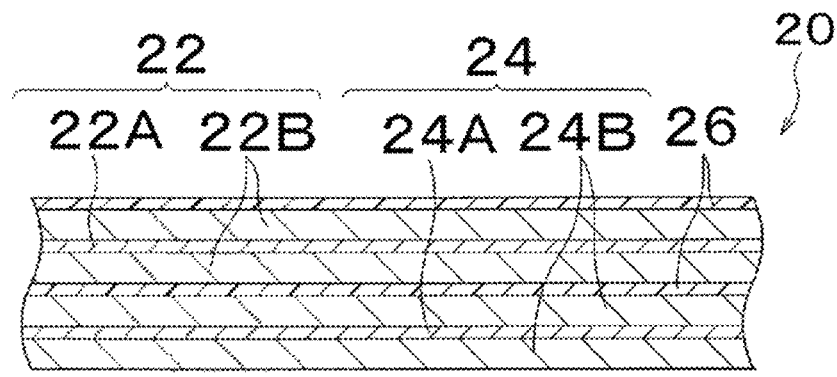
FIG. 3A is a schematic partial cross-sectional view of an enlarged part of a wound electrode body.

FIG. 2 shows a schematic cross-sectional view of a cylindrical secondary battery (lithium ion secondary battery) according to Example 1. In addition, FIG. 3A shows a schematic partial cross-sectional view of an enlarged part of a wound electrode body.

In the lithium ion secondary battery according to Example 1, a wound electrode body 20 and a pair of insulating plates 12, 13 are housed in a substantially hollow cylindrical wound electrode body housing member 11. The wound electrode body 20 can be fabricated by, for example, stacking a positive electrode 22 and a negative electrode 24 with a separator 26 interposed therebetween to obtain a stacked electrode body, then winding the stacked electrode body, and then fixing the winding end part with the adhesive tape. The positive electrode 22 has a positive electrode active material layer 22B on one side or both sides (both sides in the example shown in FIG. 3A) of a positive electrode current collector 22A. Further, the negative electrode 24 has a negative electrode active material layer 24B on one side or both sides (both sides in the example shown in FIG. 3A) of a negative electrode current collector 24A.

The wound electrode body housing member (battery can) 11 has a hollow structure with one end closed and the other end opened, which is fabricated from iron (Fe), aluminum (Al), or the like. The surface of the wound electrode body housing member 11 may be plated with nickel (Ni) or the like. The pair of insulating plates 12, 13 is disposed so as to sandwich the wound electrode body 20, and extend perpendicularly to the wound circumferential surface of the wound electrode body 20. The open end of the wound electrode body housing member 11 has a battery cover 14, a safety valve mechanism 15, and a thermosensitive resistive element (PTC element, Positive Temperature Coefficient element) 16 swaged thereto via a gasket 17, thereby making the wound electrode body housing member 11 hermetically sealed. The battery cover 14 is fabricated from, for example, the same material as the wound electrode body housing member 11. The safety valve mechanism 15 and the thermosensitive resistive element 16 are provided inside the battery cover 14, and the safety valve mechanism 15 is electrically connected to the battery cover 14 via the thermosensitive resistive element 16. The safety valve mechanism 15 has a disk plate 15A that is inverted when the internal pressure is equal to or higher than a certain level due to internal short circuit, external heating, or the like. Then, the electrical connection between the battery cover 14 and the wound electrode body 20 is thus disconnected. In order to prevent abnormal heat generation due to large current, the resistance of the thermosensitive resistive element 16 increases in response to an increase in temperature. The gasket 17 is fabricated from, for example, an insulating material. Asphalt or the like may be applied to the surface of the gasket 17.

A center pin 18 is inserted into the winding center of the wound electrode body 20. However, there is no need for the center pin 18 to be inserted into the winding center. A positive electrode lead part 23 fabricated from a conductive material such as aluminum is connected to the positive electrode 22 (more specifically, the positive electrode current collector 22A). A negative electrode lead part 25 fabricated from a conductive material such as nickel is connected to the negative electrode 24 (more specifically, the negative electrode current collector 24A). The negative electrode lead part 25 is welded to the wound electrode body housing member 11, and electrically connected to the wound electrode body housing member 11. The positive electrode lead part 23 is welded to the safety valve mechanism 15, and electrically connected to the battery cover 14. It is to be noted that the negative electrode lead part 25 is located at one site (the outermost circumferential part of the wound electrode body wound) in the example shown in FIG. 2, but may be provided at two sites (the outermost circumferential part and innermost circumferential part of the wound electrode body wound) in some cases.

In the case of assembling the secondary battery, the center pin 18 is inserted into the winding center of the wound electrode body 20, and the wound electrode body 20 is then housed inside the wound electrode body housing member 11 while sandwiching the wound electrode body 20 between the pair of insulating plates 12, 13. Then, an end of the positive electrode lead part 23 and an end of the negative electrode lead part 25 are subjected to welding, and a nonaqueous electrolytic solution (not shown in FIG. 2) is injected by a depressurization method into the wound electrode body housing member 11 to impregnate the separator 26 with the solution. Finally, the battery cover 14 and the safety valve mechanism 15 are swaged to the opening end of the wound electrode body housing member 11 via the gasket 17. Thus, a cylindrical secondary battery (for example, 18 mm in diameter×65 mm in height) can be obtained.

The data on the positive electrode 22 and the negative electrode 24 are shown in the following Table 1.

TABLE 1

| | |
|---|---|
| Positive Electrode Current Collector 22A | 15 μm thick aluminum |
| Foil Positive Electrode Active Material Layer 22B | 50 μm in thickness per side |
| Positive Electrode Lead Part 23 | 100 μm thick aluminum (Al) foil |
| Negative Electrode Current Collector 24A | 10 μm thick copper foil |
| Negative Electrode Active Material Layer 24B | 50 μm in thickness per side |
| Negative Electrode Lead Part 25 | 100 μm thick nickel (Ni) foil |

Charge/discharge cycle characteristics were evaluated based on the following method. More specifically, the test lithium ion secondary batteries according to respective examples and respective comparative examples were subjected to constant-current charge under the condition of 0.5 C in a thermostatic bath at 23° C., and switched to constant-voltage charge at the time when the battery voltage reached 4.2 volts. Then, constant-current discharge was carried out under the condition of 1 C until the battery voltage reached 2.5 volts, and the battery capacity (initial discharge capacity) was measured at the time of initial discharge.

Then, the charge/discharge cycle under the above-mentioned conditions was repeated, thereby measuring the discharge capacity in the 100-th charge/discharge cycle and the discharge capacity in the 500-th charge/discharge cycle, and calculating the capacity retention rate on the basis of the initial discharge capacity.

(Capacity Retention Rate after 100-*th* Charge/Discharge Cycle)=(Discharge Capacity in 100-*th* Charge/Discharge Cycle)/(Initial Discharge Capacity)×100(%)

(Capacity Retention Rate after 500-*th* Charge/Discharge Cycle)=(Discharge Capacity in 500-*th* Charge/Discharge Cycle)/(Initial Discharge Capacity)×100(%)

The specifications of the lithium ion secondary batteries according to Example 1A to Example 1G and Comparative Example 1A to Comparative Example 1K are shown in Table 2 below. In addition, for the lithium ion secondary batteries according to Example 1A to Example 1G, Comparative Example 1A to Comparative Example 1K, the capacity retention rates after the 100-th charge/discharge cycle and the capacity retention rates after the 500-th charge/discharge cycle are shown in Table 2 below.

TABLE 2

| | $M_1'$ | $M_2'$ | $Cp_{SO}'$ | Capacity Retention Rate after 100-th Charge/ Discharge Cycle | Capacity Retention Rate after 500-th Charge/ Discharge Cycle |
|---|---|---|---|---|---|
| Example | | | | | |
| 1A | 0.40 | 0.60 | 0.30 | 88 | 66 |
| 1B | 0.60 | 0.40 | 0.30 | 90 | 68 |
| 1C | 0.70 | 0.30 | 0.30 | 89 | 70 |
| 1D | 0.80 | 0.20 | 0.30 | 85 | 71 |
| 1E | 0.85 | 0.15 | 0.30 | 83 | 69 |
| 1F | 0.60 | 0.40 | 0.15 | 93 | 81 |
| 1G | 0.60 | 0.40 | 0.50 | 77 | 56 |

TABLE 2-continued

|  | $M_1'$ | $M_2'$ | $Cp_{SO}'$ | Capacity Retention Rate after 100-th Charge/ Discharge Cycle | Capacity Retention Rate after 500-th Charge/ Discharge Cycle |
|---|---|---|---|---|---|
| Comparative Example | | | | | |
| 1A | 1.00 | 0.00 | 0.30 | 74 | 62 |
| 1B | 0.00 | 1.00 | 0.30 | 91 | 43 |
| 1C | 0.15 | 0.85 | 0.30 | 90 | 52 |
| 1D | 0.30 | 0.70 | 0.30 | 89 | 53 |
| 1E | 0.90 | 0.10 | 0.30 | 75 | 59 |
| 1F | 0.95 | 0.05 | 0.30 | 73 | 56 |
| 1G | 0.10 | 0.90 | 0.50 | 79 | 34 |
| 1H | 0.95 | 0.05 | 0.50 | 67 | 52 |
| 1J | 0.60 | 0.40 | 0.60 | 68 | 36 |
| 1K | 0.60 | 0.40 | 0.10 | 94 | 83 |

Examples 1A to 1G exhibited favorable charge/discharge cycle retention rates for both the capacity retention rate after the 100-th charge/discharge cycle and the capacity retention rate after the 500-th charge/discharge cycle. On the other hand, Comparative Example 1A to Comparative Example 1J have favorable capacity retention rates after the 100-th charge/discharge cycle, but capacity retention rates decreased after the 500-th charge/discharge cycle, or alternatively, have favorable capacity retention rates after the 500-th charge/discharge cycle, but capacity retention rates decreased after the 100-th charge/discharge cycle. Specifically, Comparative Example 1A, Comparative Example 1E, Comparative Example 1F, and Comparative Example 1H have $M_1'$ values in excess of 0.85, and have capacity retention rates decreased after the 100-th charge/discharge cycle. On the other hand, Comparative Example 1B, Comparative Example 1C, Comparative Example 1D, and Comparative Example 1G have $M_1'$ values of less than 0.40, and have capacity retention rates decreased after the 500-th charge/discharge cycle. Furthermore, Comparative Example 1J has a $Cp_{SO}'$ value in excess of 0.5, and has a capacity retention rate decreased after the 100-th charge/discharge cycle and a capacity retention rate decreased after the 500-th charge/discharge cycle. In addition, Comparative Example 1K has favorable capacity retention rates after the 100-th charge/discharge cycle and after the 500-th charge/discharge cycle, but has a $Cp_{SO}'$ value of less than 0.15, and the excessively low proportions of the first silicon oxide particles and the second silicon oxide particles in the entire negative electrode active material have resulted in a decrease in the capacity of the lithium ion secondary battery itself.

In the conventional technology, the negative electrodes that use, as a negative electrode active material, the silicon oxide particles with surfaces covered with the carbon layer (see also Comparative Example 1A, Comparative Example 1E, Comparative Example 1F, Comparative Example 1H) have favorable long-term charge/discharge cycle characteristics, but the silicon oxide particles are likely to be isolated due to the expansion and shrinkage during the initial charge/discharge cycle, thereby disadvantageously decreasing the initial charge/discharge cycle retention rate. In addition, the composite materials of the carbon particles and the silicon oxide particles on the order of nanometers (see also Comparative Example 1B, Comparative Example 1C, Comparative Example 1D, Comparative Example 1G) can prevent, because of the particle sizes of the silicon oxide particles on the order of nanometers, particle isolation in an early stage of charge/discharge cycle, thus leading to a favorable initial charge/discharge cycle retention rate, but since the activity of the silicon oxide particles on the order of nanometers is high with respect to the nonaqueous electrolytic solution, the nonaqueous electrolytic solution is likely to be decomposed, and the carbon particles as a matrix of the composite material are likely to be deteriorated, thereby disadvantageously degrading the long-term charge/discharge cycle characteristics.

In addition, the excessively large volume of the first silicon oxide particles and the second silicon oxide particles per gram of the negative electrode active material has the possibility of causing particle isolation of the first silicon oxide particles due to expansion and shrinkage during charge/discharge cycles, or making it difficult to prevent deterioration of the carbon particles constituting the second particles. Therefore, the relationship between the discharge capacities $Cp_C$ and $Cp_{SO}$ is defined. In this regard, when the value of $Cp_{SO}'[\equiv Cp_C/(Cp_C+Cp_{SO})]$ exceeds 0.5 (see Comparative Example 1J), the expansion and shrinkage of the first silicon oxide particles and the second silicon oxide particles during the charge/discharge cycle will be significant, thereby deteriorating the charge/discharge cycle characteristics. On the other hand, when the value of $Cp_{SO}'$ is less than 0.15 (see Comparative Example 1K), the excessively low proportions of the first silicon oxide particles and the second silicon oxide particles in the entire negative electrode active material will result in a decrease in capacity of the lithium ion secondary battery itself.

Accordingly, the negative electrode active material according to Example 1 includes two kinds of particles: the first particles and the second particles, which have a defined mass ratio between the first silicon oxide particles and the second silicon oxide particles in the negative electrode active material, and a defined relationship between the discharge capacities $Cp_C$ and $Cp_{SO}$, thus making it possible to maintain great charge/discharge cycle characteristics over a long charge/discharge cycle period. More specifically, the definition can prevent a decrease in the initial charge/discharge cycle retention rate, and furthermore, prevent a decrease in long-term charge/discharge cycle retention rate. More specifically, with the following defined:

$$0.40 \leq M_1/(M_1+M_2) \leq 0.85, \text{ and}$$

$$0.15 \leq M_2/(M_1+M_2) \leq 0.60,$$

this range definition can prevent a decrease in initial charge/discharge cycle retention rate, and moreover, prevent a decrease in long-term charge/discharge cycle retention rate according to an embodiment.

Figure 4:
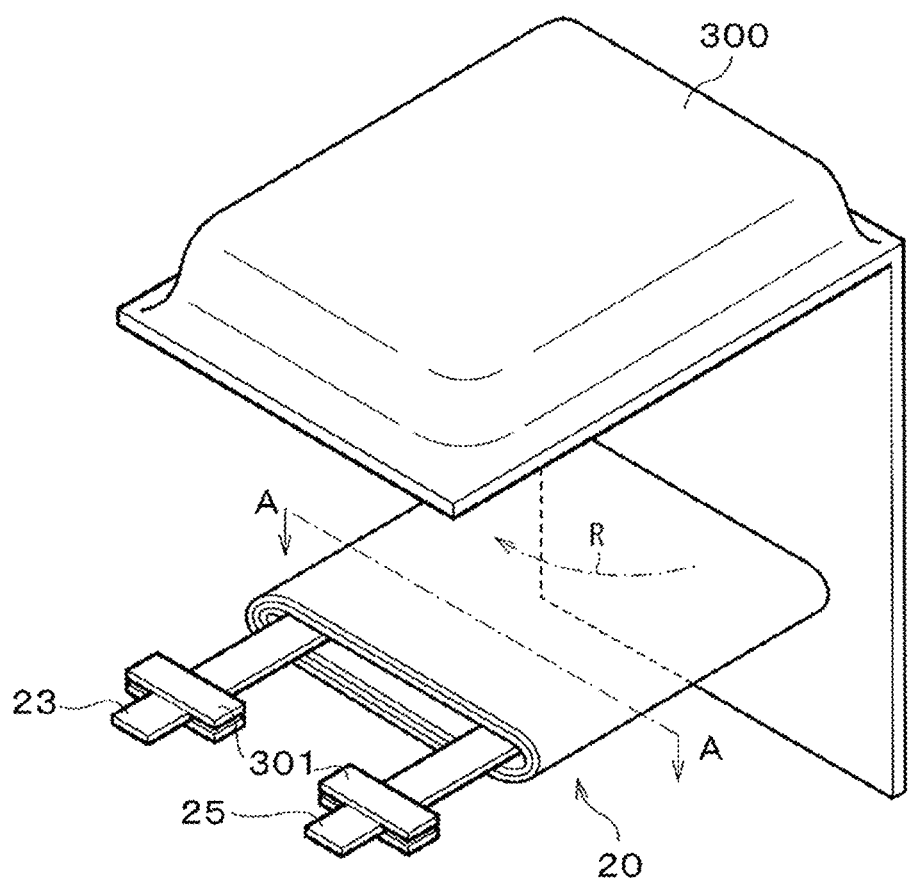
FIG. 4 is a schematic exploded perspective view of a rectangular secondary battery (lithium ion secondary battery) of laminate film type according to an embodiment.
Figure 5A:
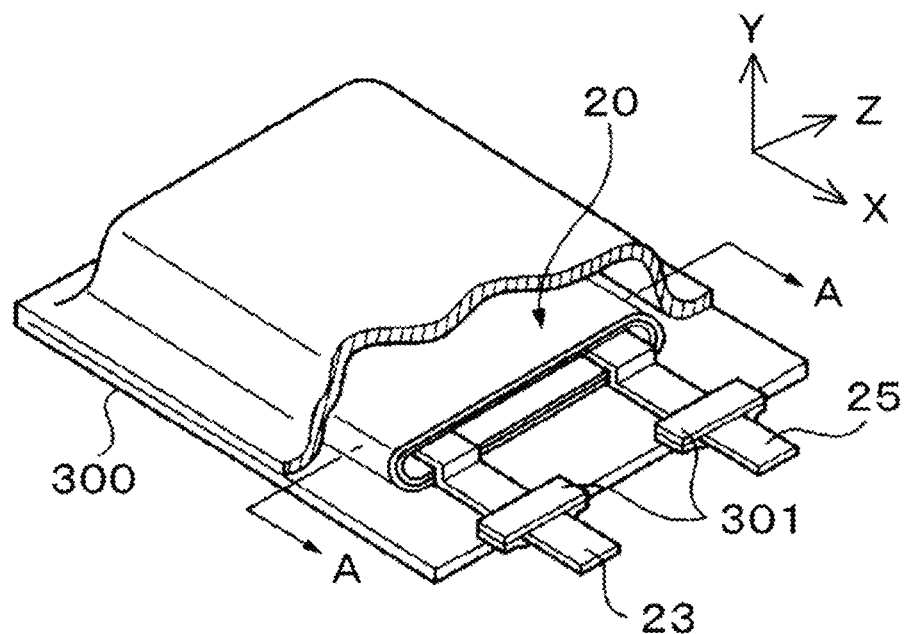
FIG. 5A is a schematic exploded perspective view of the secondary battery (lithium ion secondary battery) of laminate film type according to an embodiment in a different condition from that shown in FIG. 4.
Figure 5B:
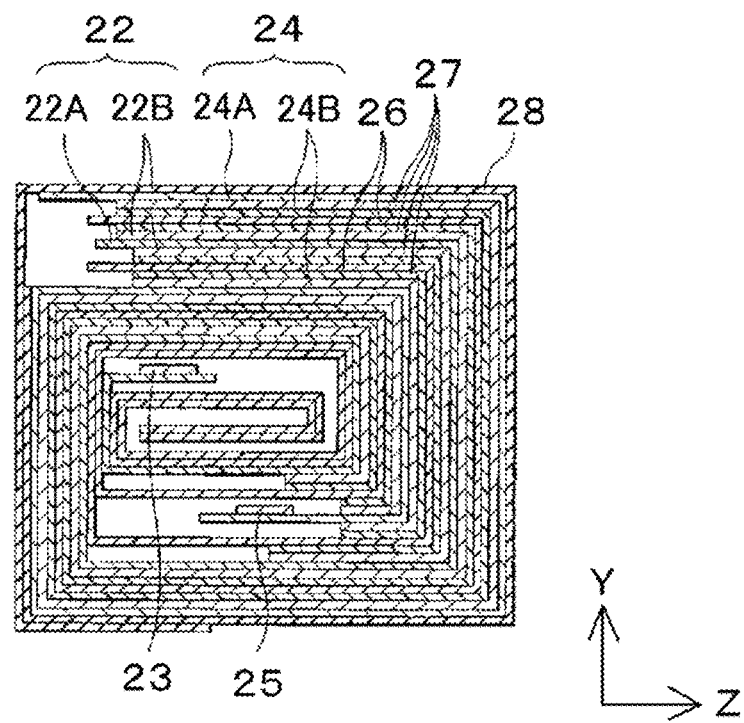
FIG. 5B is a schematic cross-sectional view of a wound electrode body in the secondary battery (lithium ion secondary battery) of laminate film type according to the embodiment, taken along the arrows A-A in FIGS. 4 and 5A.

Example 2 is a modification of Example 1, which includes a flat plate-type laminate film-type lithium ion secondary battery, where a positive electrode, a separator and a negative electrode are wound. FIGS. 4 and 5A shows schematic exploded perspective views of the lithium ion secondary battery, and FIG. 5B shows a schematic enlarged cross-sectional view taken along the arrow A-A of the wound electrode body shown in FIG. 5A (a schematic enlarged cross-sectional view along the YZ plane).

The lithium ion secondary battery according to Example 2 has a wound electrode body 20 basically similar to that according to Example 1, which is housed inside an exterior member 300 compose of a laminate film. The wound electrode body 20 can be fabricated by stacking a positive electrode 22 and a negative electrode 24 with a separator 26 and an electrolyte layer 27 interposed therebetween, and winding the stacked structure. A positive electrode lead part 23 is attached to the positive electrode 22, and a negative electrode lead part 25 is attached to the negative electrode 24. The outermost circumferential part of the wound electrode body 20 is protected by a protective tape 28.

The positive electrode lead part 23 and the negative electrode lead part 25 protrude in the same direction from the inside toward the outside of the exterior member 300. The positive electrode lead part 23 is formed from a conductive material such as aluminum. The negative electrode lead part 25 is formed from a conductive material such as copper, nickel, or stainless steel. These conductive materials have the form of, for example, a thin plate or a net.

The exterior member 300 is a sheet of film that is foldable in the direction of the arrow R shown in FIG. 4, and a part of the exterior member 300 is provided with a recess (emboss) for housing the wound electrode body 20. The exterior member 300 is, for example, a laminate film of a fusion layer, a metal layer, and a surface protective layer laminated in this order. In a process of manufacturing the lithium ion secondary battery, the exterior member 300 is folded so that the fusion layers are opposed to each other with the wound electrode body 20 interposed therebetween, and then outer circumferential edges of the fusion layers are subjected to fusion bonding to each other. However, the exterior member 300 may have two laminate films bonded to each other with an adhesive or the like interposed therebetween. The fusion layer includes, for example, a film of polyethylene, polypropylene, or the like. The metal layer includes, for example, aluminum foil or the like. The surface protective layer is composed of, for example, nylon, polyethylene terephthalate or the like. Above all, the exterior member 300 is preferably an aluminum laminate film of a polyethylene film, an aluminum foil, and a nylon film laminated in this order. However, the exterior member 300 may be a laminate film that has another laminated structure, a polymer film such as polypropylene, or a metallic film. Specifically, the member is composed of a moisture-resistant aluminum laminate film (total thickness: 100 μm) of nylon film (thickness: 30 μm), aluminum foil (thickness: 40 μm), and cast polypropylene film (thickness: 30 μm) laminated in this order from the outside.

In order to prevent entry of outside air, an adhesive film 301 is inserted between the exterior member 300 and the positive electrode lead part 23 and between the exterior member 300 and the negative electrode lead part 25. The adhesive film 301 includes a material that has adhesion to the positive electrode lead part 23 and the negative electrode lead part 25, for example, a polyolefin resin or the like, more specifically, a polyolefin resin such as polyethylene, polypropylene, modified polyethylene, or modified polypropylene.

As shown in FIG. 5B, the positive electrode 22 has a positive electrode active material layer 22B on one surface or both surfaces of a positive electrode current collector 22A. Further, the negative electrode 24 has a negative electrode active material layer 24B on one side or both sides of a negative electrode current collector 24A.

Except for the points described above, the configuration of the lithium ion secondary battery according to Example 2 can be made substantially the same as that of the lithium ion secondary battery according to Example 1, and the detailed description thereof will be thus omitted.

In Example 3, an application example of the lithium ion secondary battery according to an embodiment of the present disclosure will be described.

The application of the secondary battery according to an embodiment of the present disclosure is not particularly limited, as long as the secondary battery is applied to any machine, device, instrument, apparatus, system (assembly of multiple devices or the like) that can use the lithium ion secondary battery according to an embodiment of the present disclosure as a driving/operating power supply or a power storage source for reserve of power. The secondary battery (specifically, lithium ion secondary battery) for use as a power supply may be a main power supply (a power supply that is used preferentially), or an auxiliary power supply (in place of a main power supply, or a power supply that is used by switching from a main power supply). In the case of using the lithium ion secondary battery as an auxiliary power supply, the main power supply is not limited to any lithium ion secondary battery.

Specific examples of the application of the secondary battery (specifically, lithium ion secondary battery) according to an embodiment of the present disclosure can include, but not limited thereto, driving various types of electronic devices such as video cameras and camcorders, digital still cameras, cellular phones, personal computers, television receivers, various types of display devices, cordless telephones, headphone stereos, music players, portable radios, electronic papers such as electronic books and electronic newspapers, and portable information terminals including PDA (Personal Digital Assistant); electric devices (including portable electronic devices); toys; portable living appliances such as electric shavers; lighting such as interior lights; medical electronic devices such as pacemakers and hearing aids; memory devices such as memory cards; battery packs for use as detachable power supplies for personal computers and the like; power tools such as electric drills and electric saws; power storage systems and home energy servers (household electric storage devices) such as household battery systems intended to store electric power for emergency etc.; electric storage units and backup power supplies; electric vehicles such as electric cars, electric motorbikes, electric bicycles, and Segway (registered trademark); and electric power-driving force conversion devices of airplanes and ships (specifically, for example, a power motor).

Above all, it is effective for the secondary battery (specifically, lithium ion secondary battery) according to an embodiment of the present disclosure to be applied to a battery pack, an electric vehicle, a power storage system, a power tool, an electronic device, an electric device, or the like. Since excellent battery characteristics are required, the use of the lithium ion secondary battery according to an embodiment of the present disclosure can improve the performance in an effective manner. The battery pack is a power supply that uses a lithium ion secondary battery, which is a so-called assembled battery or the like. The electric vehicle is a vehicle that operates (travels) with the lithium ion secondary battery as a driving power supply, and may be a vehicle (a hybrid car or the like) also provided with a driving source other than the secondary battery. The power storage system is a system using a lithium ion secondary battery as a power storage source. For example, for a household power storage system, electric power is stored in the lithium ion secondary battery which serves as a power storage source, thus making it possible to use home electric appliances and the like through the use of electric power. The power tool is a tool which makes a movable part (such as a drill, for example) movable with the lithium ion secondary battery as a driving power supply. The electronic device and the electric device are devices that perform various functions with the lithium ion secondary battery as an operating power supply (power supply source).

Some application examples of the lithium ion secondary battery will be specifically described below. It is to be noted that the configuration of each application example described below is just considered by way of example, and can be changed appropriately.

Figure 6:
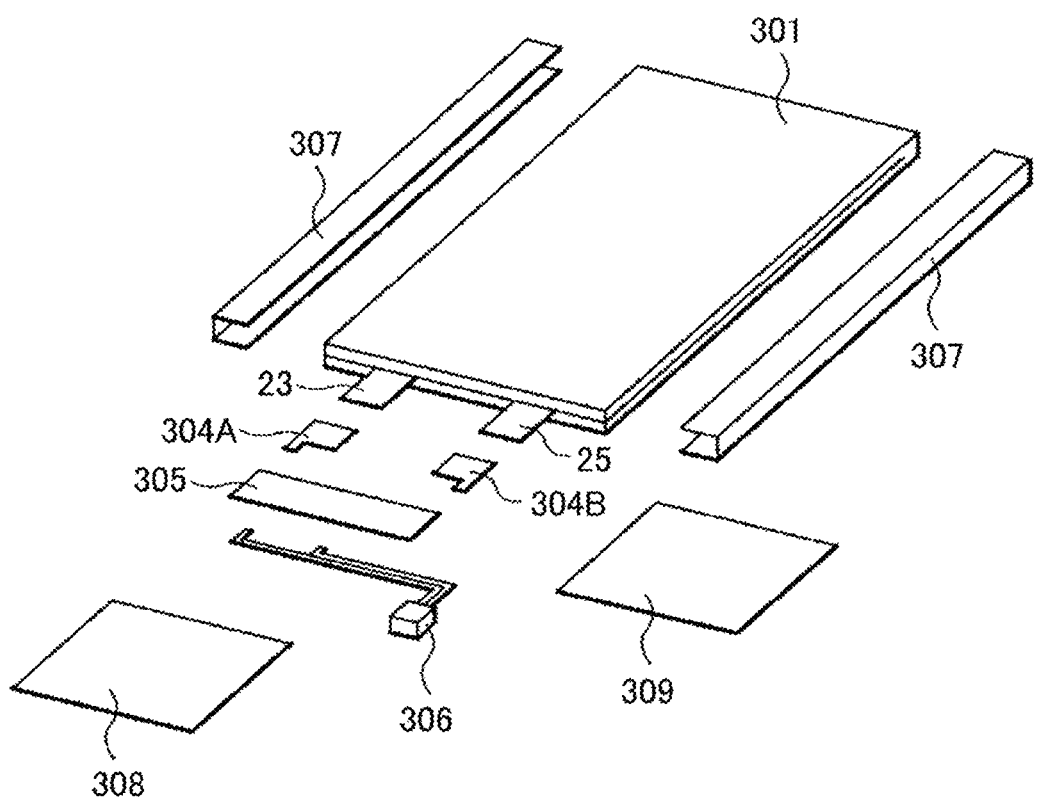
FIG. 6 is a schematic exploded perspective view of an application example (battery pack: unit cell) of the secondary battery (lithium ion secondary battery) according to an embodiment of the present disclosure.
Figure 7A:
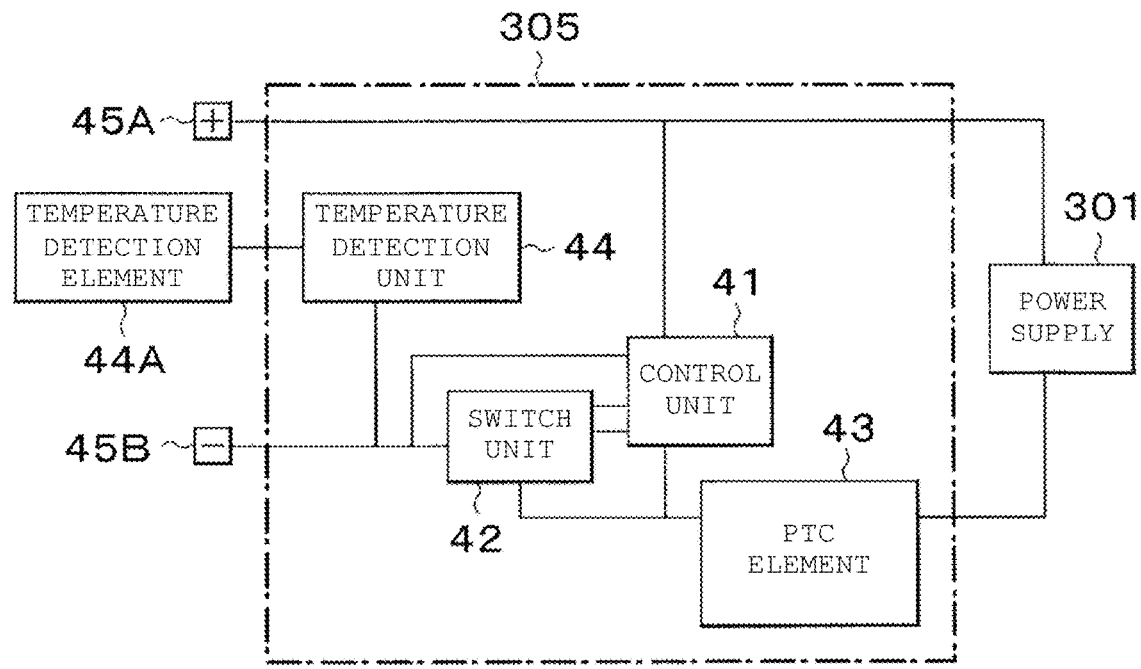
FIGS. 7A and 7B are block diagrams illustrating the configurations of application examples (battery packs: single cells) of the lithium ion secondary battery according to an embodiment of the present disclosure shown in FIG. 6.

FIG. 6 shows a schematic perspective view of a disassembled battery pack that uses a single battery according to an embodiment, and FIG. 7A shows a block diagram illustrating the configuration of a battery pack (single cell) according to an embodiment. The battery pack is a simplified battery pack (so-called soft pack) that uses one lithium ion secondary battery, which is, for example, mounted on electronic devices typified by smartphones. The battery pack includes a power supply 301 composed of the lithium ion secondary battery according to Examples 1 to 2 (Example 2 in the example shown), and a circuit board 305 connected to the power supply 301. A positive electrode lead part 23 and a negative electrode lead part 25 are attached to the power supply 301. Alternatively, the battery pack, according to an embodiment, includes:

the lithium ion secondary battery described in Examples 1 to 2;

a control unit 41, 51 for controlling the operation of the lithium ion secondary battery; and a switch unit 42, 57 for switching the operation of the lithium ion secondary battery in response to an instruction from the control unit 41.

A pair of adhesive tapes 307 is attached to both side surfaces of the power supply 301. The circuit board 305 is provided with a protection circuit (PCM: Protection Circuit Module). The circuit board 305 is connected to the positive electrode lead part 23 via a tab 304A, and connected to the negative electrode lead part 25 via a tab 304B. In addition, a connector lead wire 306 for external connection is connected to the circuit board 305. With the circuit board 305 connected to the power supply 301, the circuit board 305 is protected from above and below by a label 308 and an insulating sheet 309. The circuit board 305 and the insulating sheet 309 are fixed by attaching the label 308. The circuit board 305 includes the control unit 41, the switch unit 42, a PTC element 43, a temperature detection unit 44, and a temperature detection element 44A. The power supply 301 is connectable to the outside via a positive electrode terminal 45A and a negative electrode terminal 45B, and charged and discharged. The power supply 301 is charged and discharged via the positive electrode terminal 45A and the negative electrode terminal 45B. The temperature detection unit 44 can detect a temperature via the temperature detection element 44A.

The control unit 41 that controls the operation (including the usage state of the power supply 301) of the whole battery pack includes a central processing unit (CPU), a memory, and the like. When the battery voltage reaches the overcharge detection voltage, the control unit 41 disconnects the switch unit 42, thereby keeping any charging current from flowing through the current path of the power supply 301. Further, when a large current flows during charging, the control unit 41 disconnects the switch unit 42 to shut off the charging current. Besides, when the battery voltage reaches the overdischarge detection voltage, the control unit 41 disconnects the switch unit 42, thereby keeping any discharging current from flowing through the current path of the power supply 301. Further, when a large current flows during discharging, the control unit 41 disconnects the switch unit 42 to shut off the discharging current.

The overcharge detection voltage of the lithium ion secondary battery is, for example, 4.20 volts±0.05 volts, and the overdischarge detection voltage is, for example, 2.4 volts±0.1 volts.

In response to an instruction from the control unit 41, the switch unit 42 switches the usage state of the power supply 301 (availability of the connection between the power supply 301 and an external device). The switch unit 42 is provided with a charge control switch, a discharge control switch, and the like. The charge control switch and the discharge control switch include, for example, semiconductor switches such as a field effect transistor (MOSFET) using a metal oxide semiconductor. The charge/discharge current is detected, for example, on the basis of the on resistance of the switch unit 42. The temperature detection unit 44 including the temperature detection element 44A such as a thermistor measures the temperature of the power supply 301, and outputs the measurement result to the control unit 41. The measurement result of the temperature detection unit 44 is used for charge/discharge control by the control unit 41 in the case of abnormal heat generation, correction processing in the case of remaining capacity calculation by the control unit 41, and the like. There is no need for the circuit board 305 to be provided with the PTC element 43, and in this case, the circuit board 305 may be provided separately with a PTC element.

Figure 7B:
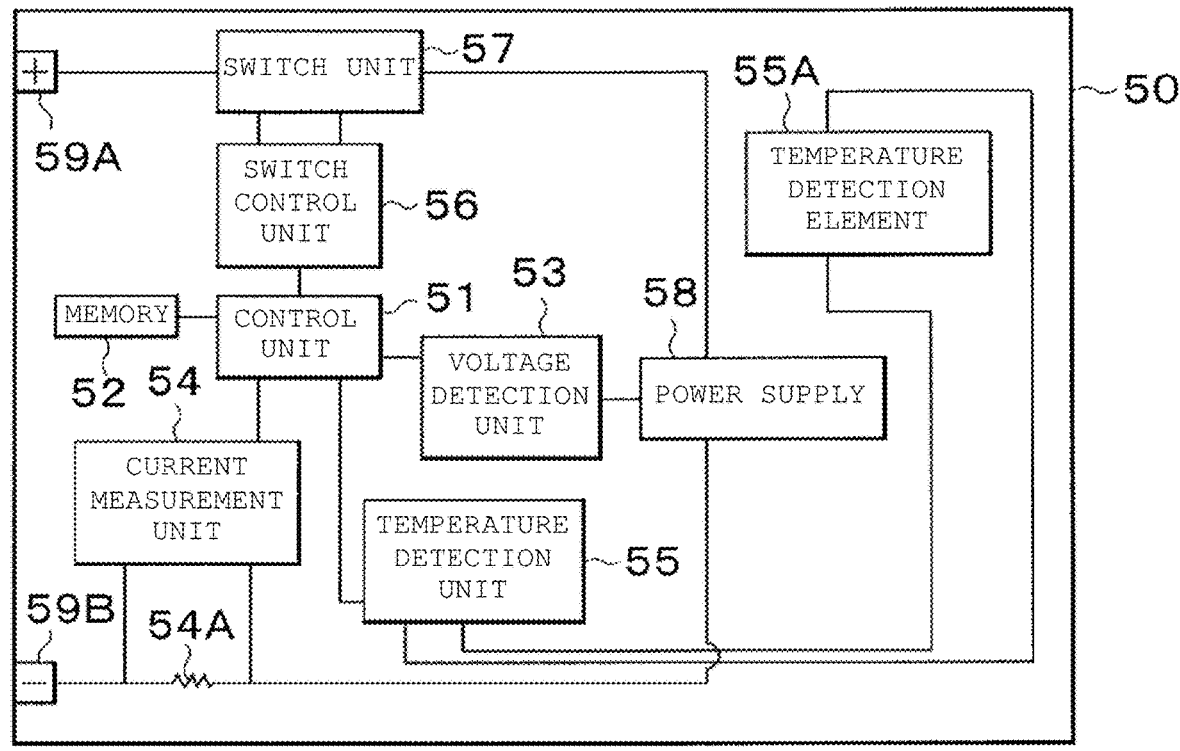

Next, FIG. 7B shows a block diagram illustrating the configuration of another battery pack (assembled battery) different from what is shown in FIG. 7A according to an embodiment. This battery pack includes, for example, inside a housing 50 fabricated from a plastic material or the like, a control unit 51, a memory 52, a voltage detection unit 53, a current measurement unit 54, a current detection resistor 54A, a temperature detection unit 55, a temperature detection element 55A, a switch control unit 56, a switch unit 57, a power supply 58, a positive electrode terminal 59A, and a negative electrode terminal 59B.

The control unit 51 controls the operation (including the usage state of the power supply 58) of the whole battery pack, and includes, for example, a CPU and the like. The power supply 58 is composed of, for example, one lithium ion secondary battery (not shown) as described in Example 1 to Example 2, or an assembled battery including two or more lithium ion secondary batteries (not shown), and the connection form of the lithium ion secondary batteries may be a connection in series, a connection in parallel, or a mixed type of the both. To give an example, the power supply 58 includes six lithium ion secondary batteries connected in the form of two in parallel and three in series.

In response to an instruction from the control unit 51, the switch unit 57 switches the usage state of the power supply 58 (availability of the connection between the power supply 58 and an external device). The switch unit 57 is provided with, for example, a charge control switch, a discharge control switch, a charging diode, and a discharging diode (none of which are shown). The charge control switch and the discharge control switch are composed of, for example, semiconductor switches such as a MOSFET.

The current measurement unit 54 measures current through the use of the current detection resistor 54A, and outputs the measurement result to the control unit 51. The temperature detection unit 55 measures a temperature through the use of the temperature detection element 55A, and outputs the measurement result to the control unit 51. The temperature measurement result is used, for example, for charge/discharge control by the control unit 51 in the case of abnormal heat generation, correction processing in the case of remaining capacity calculation by the control unit 51, and the like. The voltage detection unit 53 measures the voltage of the lithium ion secondary battery in the power supply 58, converts the measured voltage from analog to digital, and supplies the converted voltage to the control unit 51.

The switch control unit 56 controls the operation of the switch unit 57 in response to the signals input from the current measurement unit 54 and the voltage detection unit 53. For example, when the battery voltage reaches the overcharge detection voltage, the switch control unit 56 disconnects the switch unit 57 (charge control switch), thereby achieving control so as to keep any charging current from flowing through the current path of the power supply 58. Thus, only discharge via the discharging diode is allowed in the power supply 58. Further, for example, when a large current flows during charging, the switch control unit 56 cuts off the charging current. Furthermore, for example, when the battery voltage reaches the overdischarge detection voltage, the switch control unit 56 disconnects the switch unit 57 (discharge control switch), thereby keeping any discharging current from flowing through the current path of the power supply 58. Thus, only charge via the charging diode is allowed in the power supply 58. Further, for example, when a large current flows during discharging, the switch control unit 56 cuts off the discharging current.

The overcharge detection voltage of the lithium ion secondary battery is, for example, 4.20 volts±0.05 volts, and the overdischarge detection voltage is, for example, 2.4 volts±0.1 volts.

The memory 52, in an embodiment, includes, for example, an EEPROM that is a non-volatile memory, or the like. The memory 52 stores, for example, numerical values calculated by the control unit 51, information on the lithium ion secondary battery, measured at the stage of manufacturing process (for example, internal resistance in the initial state, etc.), and the like. Storing the full charge capacity of the lithium ion secondary battery in the memory 52 allows the control unit 51 to grasp information such as the remaining capacity. The temperature detection element 55A composed of a thermistor or the like measures the temperature of the power supply 58, and outputs the measurement result to the control unit 51. The positive electrode terminal 59A and the negative electrode terminal 59B are terminals connected to an external device (for example, a personal computer, etc.) operated by the battery pack, or an external device or the like (for example, a charger, etc.) used for charging the battery pack. The power supply 58 is charged/discharged via the positive electrode terminal 59A and the negative electrode terminal 59B.

Figure 8A:
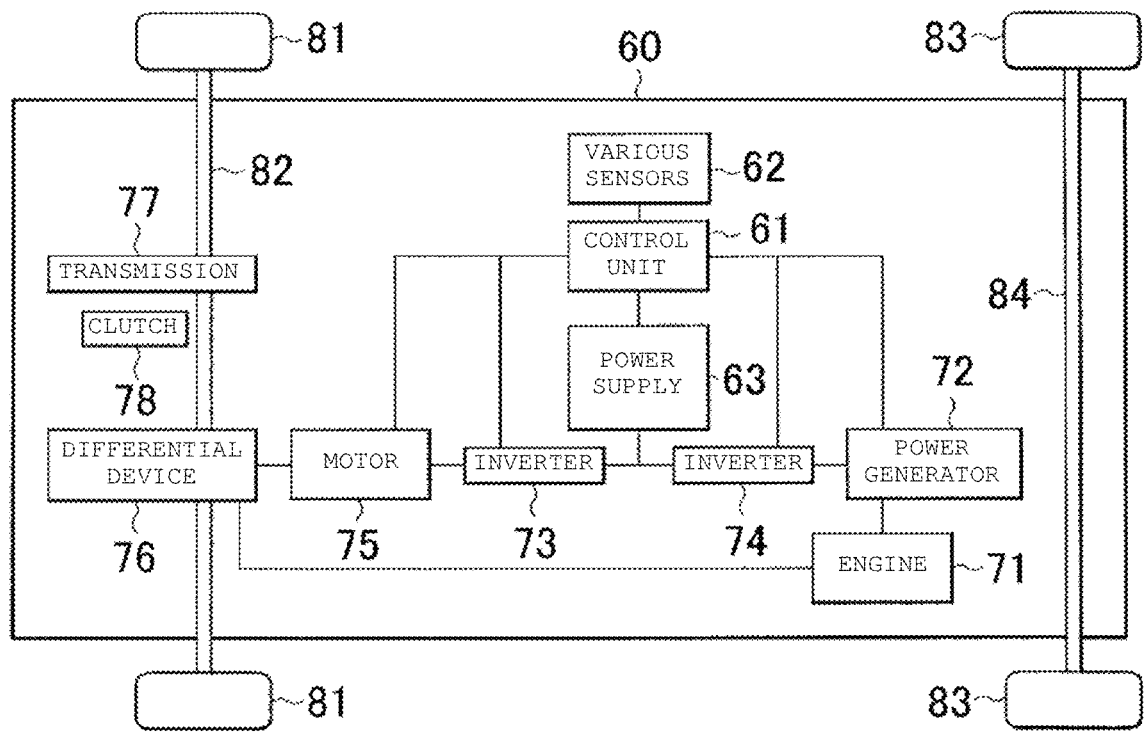
FIGS. 8A, 8B, and 8C are respectively a block diagram illustrating the configuration of an application example (electric vehicle) of the secondary battery (lithium ion secondary battery) according to an embodiment of the present disclosure, a block diagram illustrating the configuration of an application example (power storage system) of the secondary battery (lithium ion secondary battery) according to another embodiment of the present disclosure, and a block diagram illustrating the configuration of an application example (power tool) of the secondary battery (lithium ion secondary battery) according to a further embodiment of the present disclosure.

Next, FIG. 8A shows a block diagram illustrating the configuration of an electric vehicle, such as a hybrid car that is an example of an electric vehicle. The electric vehicle includes, for example, inside a metallic housing 60, a control unit 61, various sensors 62, a power supply 63, an engine 71, a power generator 72, inverters 73, 74, a motor 75 for driving, a differential device 76, a transmission 77, and a clutch 78. Besides, the electric vehicle includes, for example, a front wheel drive shaft 82 connected to the differential device 76 and the transmission 77, front wheels 81, a rear wheel drive shaft 84, and rear wheels 83. More specifically, the electric vehicle includes:

the lithium ion secondary battery described in Examples 1 to 2;

a conversion unit 73 for converting electric power supplied from the lithium ion secondary battery, to a driving force;

a driving unit 75 for driving in response to the driving force; and a control unit 61 for controlling the operation of the lithium ion secondary battery.

The electric vehicle can run, for example, with either the engine 71 or the motor 75 as a driving source. The engine 71 is a main power source, for example, a gasoline engine or the like. When the engine 71 is adopted as a power supply, the driving force (torque) of the engine 71 is transmitted to the front wheels 81 or the rear wheels 83 via, for example, the differential device 76, the transmission 77, and the clutch 78 which are driving units. The torque of the engine 71 is also transmitted to the power generator 72, the power generator 72 generates alternating-current power by the use of the torque, and the alternating-current power is converted to direct-current power via the inverter 74, and stored in the power supply 63. On the other hand, when the motor 75 as a conversion unit is adopted as a power supply, the power (direct-current power) supplied from the power supply 63 is converted to alternating-current power via the inverter 73, and the motor 75 is driven by the use of the alternating-current power. The driving force (torque) converted from the power by the motor 75 is transmitted to the front wheels 81 or the rear wheels 83 via, for example, the differential device 76, the transmission 77, and the clutch 78 which are driving units.

The electric vehicle may be configured such that when the electric vehicle is decelerated via a braking mechanism, not shown, the resistance force at the time of deceleration is transmitted as a torque to the motor 75, and the motor 75 generates alternating-current power by the use of the torque. The alternating-current power is converted to direct-current power via the inverter 73, and the direct-current regenerative power is stored in the power supply 63.

The control unit 61 intended to control the operation of the whole electric vehicle, includes, for example, a CPU and the like. The power supply 63 includes one or more lithium ion secondary batteries (not shown) as described in Example 1 to Example 2. The power supply 63 may be configured to be connected to an external power supply, and supplied with power from the external power supply to store electric power. The various sensors 62 are used, for example, for controlling the rotation speed of the engine 71, and controlling the position (throttle position) of a throttle valve, not shown. The various sensors 62 include, for example, a speed sensor, an acceleration sensor, an engine speed sensor, and the like.

It should be appreciated and understood that although a case where the electric vehicle is a hybrid car has been described, the electric vehicle may be a vehicle (electric car) that operates through the use of only the power supply 63 and the motor 75 without using the engine 71.

Figure 8B:
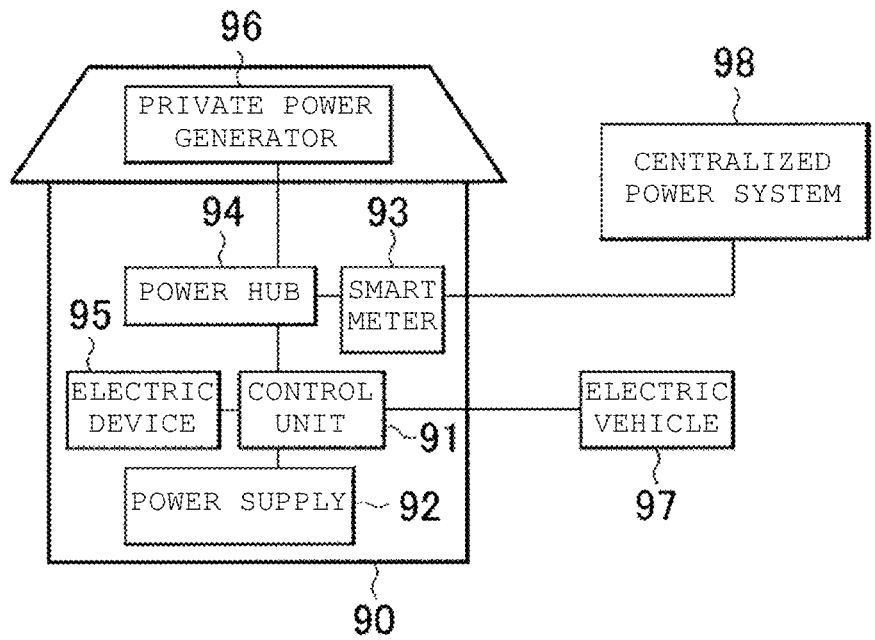

Next, FIG. 8B shows a block diagram illustrating the configuration of a power storage system. The power storage system includes, for example, a control unit 91, a power supply 92, a smart meter 93, and a power hub 94 inside a house 90 such as a general house and a commercial building. More specifically, the power storage system includes:

the lithium ion secondary battery described in Examples 1 to 2;

one or more electric devices 95, 97 supplied with electric power from the lithium ion secondary battery; and a control unit 91 for controlling the power supply to the electric devices 95, 97 from the lithium ion secondary battery. In addition, the electronic device (electric device) 95 includes the lithium ion secondary battery described in Example 1 to Example 2 as a power supply source.

The power supply 92 is connected to, for example, the electric device (electronic device) 95 installed inside the house 90, and connectable to the electric vehicle 97 parked outside the house 90. Further, the power supply 92 is, for example, connected via the power hub 94 to a private power generator 96 installed in the house 90, and connectable to an external centralized power system 98 via the smart meter 93 and the power hub 94. The electric device (electronic device) 95 includes, for example, one or more home electric appliances. Examples of the home electric appliances can include a refrigerator, an air conditioner, a television receiver, and a water heater. The private power generator 96 is composed of, for example, a solar power generator, a wind power generator, or the like. Examples of the electric vehicle 97 can include an electric car, a hybrid car, an electric motorcycle, an electric bicycle, and a Segway (registered trademark). Examples of the centralized power system 98 can include commercial power supplies, power generation devices, power transmission networks, and smart grids (next-generation power transmission networks), and examples thereof can include thermal power plants, nuclear power plants, hydroelectric power plants, and wind power plants, and examples of a power generation device provided in the centralized power system 98 can include various solar cells, fuel cells, wind power generation devices, micro-hydro power generation devices, and geothermal power generation devices, but the centralized power system 98 and the power generation device are not limited thereto.

The control unit 91 intended to control the operation (including the usage state of the power supply 92) of the whole power storage system, includes, for example, a CPU and the like. The power supply 92 includes one or more lithium ion secondary batteries (not shown) as described in Example 1 to Example 2. The smart meter 93 is, for example, a network-compatible power meter installed in the house 90 on the power demand side, which is capable of communicating with the power supply side. Further, the smart meter 93 controls the balance between demand and supply in the house 90 while communicating with the outside, thereby allowing efficient and stable supply of energy.

In this power storage system, for example, power is stored in the power supply 92 via the smart meter 93 and the power hub 94 from the centralized power system 98, which is an external power supply, and power is stored in the power supply 92 via the power hub 94 from the private power generator 96, which is an independent power supply. The electric power stored in the power supply 92 is supplied to the electric device (electronic device) 95 and the electric vehicle 97 in response to an instruction from the control unit 91, thus allowing the operation of the electric device (electronic device) 95, and allowing the electric vehicle 97 to be charged. More specifically, the power storage system is a system that allows power to be stored and supplied in the house 90 with the use of the power supply 92.

The electric power stored in the power supply 92 is arbitrarily available. Therefore, for example, electric power can be stored in the power supply 92 from the centralized power system 98 at midnight when the electricity charge is inexpensive, and the electric power stored in the power supply 92 can be used during the day when the electricity charge is expensive.

The power storage system described above may be installed for every single house (one household), or may be installed for every multiple houses (multiple households).

Figure 8C:
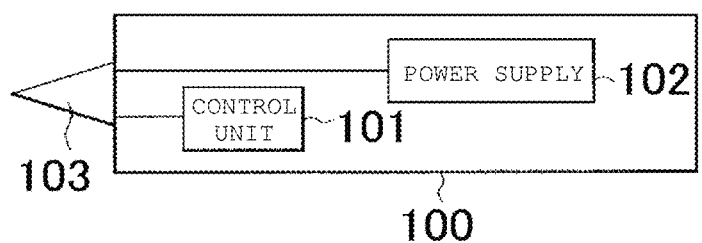

Next, FIG. 8C shows a block diagram illustrating the configuration of a power tool. The power tool includes the lithium ion secondary battery described in Example 1 to Example 2, and a movable part 103 supplied with electric power from the lithium ion secondary battery. Specifically, the power tool is, for example, an electric drill, which includes a control unit 101 and a power supply 102 inside a tool body 100 made from a plastic material or the like. For example, a drill part 103 as a movable part is rotatably attached to the tool body 100. The control unit 101 intended to control the operation (including the usage state of the power supply 102) of the whole power tool, includes, for example, a CPU and the like. The power supply 102 includes one or more lithium ion secondary batteries (not shown) as described in Example 1 to Example 2. The control unit 101 supplies electric power from the power supply 102 to the drill part 103 in response to an operation of an operation switch, not shown.

Although the present disclosure has been described with reference to the preferred examples, the present disclosure is not to be considered limited to these examples, and various modifications can be made to the disclosure. The configurations and structures of the negative electrode active material, negative electrode for a secondary battery, and lithium ion secondary battery described in the examples are considered by way of example, and can be changed as appropriate. The wound electrode body may be wound, but may be stacked. Further, the secondary battery is not to be considered limited to the lithium ion secondary battery.

The carbon particles constituting the second particles can be configured to include non-graphitizable carbon, or the carbon particles constituting the second particles can be configured to include a spherical carbon material, or can be configured to be composed of a spheroidized scaly carbon material. Further, in these cases, the second silicon oxide particles can be configured to be disposed on the surfaces of the carbon particles constituting the second particles, the particle size of the second silicon oxide particle in the major axis direction can be configured to be $3 \times 10^{-8}$ m to $1 \times 10^{-6}$ m, specifically, for example, 0.1 μm, and the particle size of the second particle can be configured to be $5 \times 10^{-6}$ m to $5 \times 10^{-5}$ m, specifically, for example, 15 μm. Examples of the non-graphitizable carbon can include coke such as pitch coke, needle coke, and petroleum coke. The foregoing configuration of the second particles has also successfully achieved a similar effect to that described in Example 1.

In an embodiment, the paste-like negative electrode mixture slurry can be configured as follows, for example. More specifically, 97 parts by mass of a mixture of a carbon material, the first particles 1 and the second particles 4, and 3 parts by mass of a negative electrode binder (polyvinylidene fluoride) are mixed to provide a negative electrode mixture. The negative electrode mixture is mixed with an organic solvent (N-methyl-2-pyrrolidone) to provide a paste-like negative electrode mixture slurry.

The positive electrode, the nonaqueous electrolytic solution, and the like constituting the lithium ion secondary battery described previously will be described in detail below.

The paste-like positive electrode mixture slurry can be configured as follows, for example. More specifically, first, lithium carbonate ($Li_2CO_3$) and cobalt carbonate ($CoCO_3$) are mixed, and the mixture is then subjected to firing in air (900° C.×5 hours) to obtain a lithium-containing composite oxide ($LiCoO_2$). In this case, the mixing ratio is adapted to be, for example, $Li_2CO_3:CoCO_3=0.5:1$ in molar ratio. Then, 91 parts by mass of a positive electrode active material (LiCoO$_2$), 3 parts by mass of a positive electrode binder (polyvinylidene fluoride), and 6 parts by mass of a positive electrode conducting agent (graphite) are mixed to provide a positive electrode mixture. Then, the positive electrode mixture is mixed with an organic solvent (N-methyl-2-pyrrolidone) to provide a paste-like positive electrode mixture slurry. Thereafter, the positive electrode mixture slurry is applied to both sides of the belt-like positive electrode current collector 22A with the use of a coating device, and the positive electrode mixture slurry is then dried to form the positive electrode active material layer 22B. Then, the positive electrode active material layer 22B is subjected to compression molding with the use of a roll press machine.

As the positive electrode active material, a compound represented by the following formula (A) or a LiNiMnO-based material can also be used.

$$Li_{1+a}(Mn_bCo_cNi_{1-b-c})_{1-a}M^0{}_dO_{2-e} \qquad (A).$$

Here, "M$^0$" is at least one of elements that belong to Group 2 to Group 15 (excluding manganese, cobalt and nickel) in the long periodic table, and $0<a<0.25$, $0.3 \le b<0.7$, $0 \le c<1-b$, $0 \le d \le 1$, and $0 \le e \le 1$ are satisfied. Specifically, examples of the compound can include Li$_{1.15}$(Mn$_{0.65}$Ni$_{0.22}$Co$_{0.13}$)$_{0.85}$O$_2$. In addition, examples of the LiNiMnO-based material can include, specifically, LiNi$_{0.5}$Mn$_{1.50}$O$_4$.

First, nickel sulfate (NiSO$_4$), cobalt sulfate (CoSO$_4$), and manganese sulfate (MnSO$_4$) are mixed in the case of using Li$_{1.15}$(Mn$_{0.65}$Ni$_{0.22}$Co$_{0.13}$)$_{0.85}$O$_2$ as the positive electrode active material. Then, the mixture is dispersed in water to prepare an aqueous solution. Then, while sufficiently stirring the aqueous solution, sodium hydroxide (NaOH) is added to the aqueous solution to obtain a coprecipitate (manganese.nickel.cobalt composite coprecipitated hydroxide). Thereafter, the coprecipitate is washed with water and then dried, and lithium hydroxide monohydrate is then added to the coprecipitate to obtain a precursor. Then, the precursor is subjected to firing (800° C.×10 hours) in the atmosphere, thereby making it possible to obtain the above-described positive electrode active material.

In addition, in the case of using LiNi$_{0.5}$Mn$_{1.50}$O$_4$ as the positive electrode active material, first, lithium carbonate (Li$_2$CO$_3$), manganese oxide (MnO$_2$), and nickel oxide (NiO) are weighed, and the weighed oxides are mixed with the use of a ball mill. In this case, the mixing ratio (molar ratio) between the main elements is adapted to be Ni:Mn=25:75. Then, the mixture is subjected to firing (800° C.×10 hours) in the atmosphere, and then cooled. Next, the fired product is re-mixed with the use of a ball mill, and then the fired product is re-firing (700° C.×10 hours) in the atmosphere, thereby making it possible to obtain the above-described positive electrode active material.

Alternatively, here are details of the lithium-containing composite oxide and the lithium-containing phosphate compound, which are preferred materials for constituting the positive electrode active material. It is to be noted that other elements constituting the lithium-containing composite oxide and the lithium-containing phosphate compound are not particularly limited, but examples thereof can include any one or more elements that belong to Group 2 to Group 15 in the long period periodic table, and from the viewpoint of achieving a high voltage, it is preferable to use nickel (Ni), cobalt (Co), manganese (Mn), or iron (Fe).

Specifically, examples of the lithium-containing composite oxide that has a layered rock salt crystal structure can include compounds represented by the formula (B), the formula (C), and the formula (D):

$$Li_aMn_{1-b-c}Ni_bM^{11}{}_cO_{2-d}F_e \qquad (B).$$

Here, M$^{11}$ is at least one element selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), and the values of a, b, c, d and e satisfy the following:

$0.8 \le a \le 1.2$;

$0<b<0.5$;

$0 \le c \le 0.5$;

$b+c<1$;

$-0.1 \le d \le 0.2$; and $0 \le e \le 0.1$. However, the composition varies depending on the charge/discharge condition, and a refers to the value in a full discharge condition.

$$Li_aNi_{1-b}M^{12}{}_bO_{2-c}F_d \qquad (C).$$

Here, M$^{12}$ is at least one element selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and the values of a, b, c, and d satisfy the following:

$0.8 \le a \le 1.2$;

$0.005 \le b \le 0.5$;

$-0.1 \le c \le 0.2$; and $0 \le d \le 0.1$. However, the composition varies depending on the charge/discharge condition, and a refers to the value in a full discharge condition.

$$Li_aCO_{1-b}M^{13}{}_bO_{2-c}F_d \qquad (D).$$

Here, M$^{13}$ is at least one element selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and the values of a, b, c, and d satisfy the following:

$0.8 \le a \le 1.2$;

$0 \le b<0.5$;

$-0.1 \le c \le 0.2$; and $0 \le d \le 0.1$. However, the composition varies depending on the charge/discharge condition, and a refers to the value in a full discharge condition.

Specifically, examples of the lithium-containing composite oxide that has a layered rock salt crystal structure can include LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.5}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$, and Li$_{1.15}$(Mn$_{0.65}$Ni$_{0.22}$Co$_{0.13}$)O$_2$.

Further, examples of the lithium-containing composite oxide that has a spinel-type crystal structure can include a compound represented by the formula (E):

$$Li_aMn_{2-b}M^{14}{}_bO_cF_d \qquad (E).$$

Here, M$^{14}$ is at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), and the values of a, b, c, and d satisfy the following:

$0.9 \leq a \leq 1.1$;

$0 \leq b \leq 0.6$;

$3.7 \leq c \leq 4.1$; and $0 \leq d \leq 0.1$. However, the composition varies depending on the charge/discharge condition, and a refers to the value in a full discharge condition. Specifically, examples of the lithium-containing composite oxide that has a spinel-type crystal structure can include $LiMn_2O_4$.

Furthermore, examples of the lithium-containing phosphate compound that has an olivine-type crystal structure can include a compound represented by the formula (F):

$$Li_a M^{15} PO_4 \tag{F}$$

Here, $M^{15}$ is at least one element selected from the group consisting of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), and the value of a satisfies the following:
$0.9 \leq a \leq 1.1$. However, the composition varies depending on the charge/discharge condition, and a refers to the value in a full discharge condition. Specifically, examples of the lithium-containing phosphate compound that has an olivine-type crystal structure can include $LiFePO_4$, $LiMnPO_4$, $LiFe_{0.5}Mn_{0.5}PO_4$, and $LiFe_{0.3}Mn_{0.7}PO_4$.

Alternatively, examples of the lithium-containing composite oxide can include a compound represented by the formula (G).

$$(Li_2MnO_3)_x(LiMnO_2)_{1-x} \tag{G}$$

where the value of x satisfies the following:
$0 \leq x \leq 1$. However, the composition varies depending on the charge/discharge condition, and x is the value in a full discharge condition.

Alternatively, examples of a lithium-free metal sulfide or metal oxide can include $TiS_2$, $MoS_2$, $NbSe_2$, and $V_2O_5$.

The positive electrode active material layer may include, besides, for example, oxides such as titanium oxide, vanadium oxide, and manganese dioxide; disulfides such as titanium disulfide and molybdenum sulfide; chalcogenides such as niobium selenide; and conductive polymers such as sulfur, polyaniline, and polythiophene.

The composition of the nonaqueous electrolytic solution can be also adapted as in Tables 3 and 4 below. It is to be noted that the solvent of the nonaqueous electrolytic solution refers to a broad concept that encompasses not only liquid materials, but also materials that have ion conductivity, capable of dissociating electrolyte salts. Therefore, in the case of using a polymer compound that has ion conductivity, the polymer compound is also included in the solvent.

TABLE 3

| Organic Solvent | 1/1 in EC/PC mass ratio |
|---|---|
| Lithium salt constituting nonaqueous electrolytic solution | $LiPF_6$ 1.0 mol/liter |

TABLE 4

| Organic Solvent | 3/5 in EC/DMC mass ratio |
|---|---|
| Lithium salt constituting nonaqueous electrolytic solution | $LiPF_6$ 1.0 mol/liter |

In the case of preparing the nonaqueous electrolytic solution according to an embodiment, for example, a first compound, a second compound, a third compound, and other materials can be mixed and stirred as an embodiment. Lithium bisfluorosulfonylimide (LiFSI) or lithium bistrifluoromethylsulfonylimide (LiTFSI) is used as the first compound. In addition, acetonitrile (AN), propionitrile (PN), or butyronitrile (BN) which is a non-oxygen containing mononitrile compound, or methoxyacetonitrile (MAN) which is an oxygen-containing mononitrile compound is used as the second compound. Furthermore, vinylene carbonate (VC), vinylethylene carbonate (VEC), or methylene ethylene carbonate (MEC) which is an unsaturated cyclic carbonate, or 4-fluoro-1,3-dioxolan-2-one (FEC) or bis(fluoromethyl) carbonate (DFDMC) which is a halogenated carbonate, or succinonitrile (SN) which is a polynitrile compound is used as the third compound. Furthermore, ethylene carbonate (EC) which is a cyclic carbonate, dimethyl carbonate (DMC) which is a chain carbonate, and lithium hexafluorophosphate ($LiPF_6$) and lithium tetrafluoroborate ($LiBF_4$) which are electrolyte salts are used as other materials.

Further, the nonaqueous electrolytic solution suitable for use in the lithium ion secondary battery is not to be considered limited, but examples thereof can include a nonaqueous electrolytic solution including:

a compound represented by the formula (1);

at least one compound of a compound represented by the formula (2-A) and a compound represented by the formula (2-B); and at least one compound of compounds represented by formulas (3-A) to (3-F). It is to be noted that the content of the compound represented by formula (1) in the nonaqueous electrolytic solution is desirably 2.5 mol/liter to 6 mol/liter, preferably 3 mol/liter to 6 mol/liter.

$$M^+[(Z^1Y^1)(Z^2Y^2)N]^- \tag{1}$$

where M represents a metal element, each of $Z^1$ and $Z^2$ represents any of a fluorine group (—F), a monovalent hydrocarbon group, and a monovalent fluorinated hydrocarbon group, at least one of $Z^1$ and $Z^2$ represents any of a fluorine group (—F) and a monovalent fluorinated hydrocarbon group, and each of $Y^1$ and $Y^2$ represents any of a sulfonyl group (—S(=O)$_2$—) and a carbonyl group (—C(=O)—).

$$R^1—CN \tag{2-A}$$

$$R^2—X—CN \tag{2-B}$$

where $R^1$ represents a monovalent hydrocarbon group, $R^2$ represents a monovalent hydrocarbon group, and X represents a group where one or more ether bonds (—O—) and one or more divalent hydrocarbon groups are bonded in an arbitrary order.

(3-A)

-continued

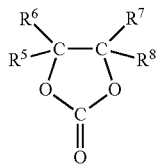
(3-B)

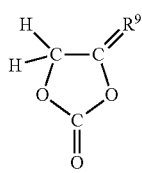
(3-C)

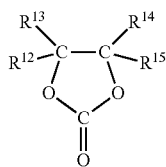
(3-D)

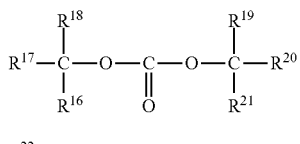
(3-E)

$R^{22}-(CN)_n$ (3-F)

In this regard, in the formula (3-A), each of $R^3$ and $R^4$ represents any of a hydrogen group (—H) and a monovalent hydrocarbon group. In addition, in the formula (3-B), each of $R^5$, $R^6$, $R^7$, and $R^8$ represents any of a hydrogen group, a monovalent saturated hydrocarbon group, and a monovalent unsaturated hydrocarbon group, and at least one of $R^5$, $R^6$, $R^7$, and $R^8$ represents a monovalent unsaturated hydrocarbon group. Furthermore, in the formula (3-C), $R^9$ represents a group represented by $>CR^{10}R^{11}$, and each of $R^{10}$ and $R^{11}$ represents any of a hydrogen group and a monovalent hydrocarbon group. In addition, in the formula (3-D), each of $R^{12}$, $R^{13}$, $R^{14}$, and $R^{15}$ represents any of a hydrogen group, a halogen group, a monovalent hydrocarbon group, and a monovalent halogenated hydrocarbon group, and at least one of $R^{12}$, $R^{13}$, $R^{14}$, and $R^{15}$ represents any of a halogen group and a monovalent halogenated hydrocarbon group. Furthermore, in the formula (3-E), each of $R^{16}$, $R^{17}$, $R^{18}$, $R^{19}$, $R^{20}$, and $R^{21}$ represents any of a hydrogen group, a halogen group, a monovalent hydrocarbon group, and a monovalent halogenated hydrocarbon group, and at least one of $R^{16}$, $R^{17}$, $R^{18}$, $R^{19}$, $R^{20}$, and $R^{21}$ represents any of a halogen group and a monovalent halogenated hydrocarbon group. In addition, in the formula (3-F), $R^{22}$ represents a hydrocarbon group that has a valence of n (where n is an integer of 2 or more). It is to be noted that ">C" or "C<" indicates that two joining hands extend from a carbon atom.

Specifically, the nonaqueous electrolytic solution mentioned above includes a first compound that has a sulfonylimide-type structure, a second compound that has an acetonitrile-type structure, and a third compound that has a reactive group such as an unsaturated hydrocarbon group. In this regard, the nonaqueous electrolytic solution has the foregoing composition, because the following advantage is achieved. More specifically, when the nonaqueous electrolytic solution includes the first compound, the second compound, and the third compound together, and when the content of the first compound in the nonaqueous electrolytic solution falls within the foregoing range (2.5 mol/liter to 6 mol/liter), the synergistic interaction among the first compound, the second compound, and the third compound peculiarly improves the chemical stability of the nonaqueous electrolytic solution, thereby suppressing the decomposition reaction of the nonaqueous electrolytic solution during charging/discharging. Therefore, even in the case of the charging/discharging repeated, the discharge capacity is made less likely to be decreased, thereby making it possible to improve the battery characteristics of the lithium ion secondary battery. In particular, whether the peculiar synergistic interaction described here is obtained or not depends on the content of the first compound. Therefore, the peculiar synergistic interaction is obtained only when the content of the first compound falls within the range mentioned above.

The first compound contains one or more of the compounds represented by formula (1). The first compound, which is a salt containing a cation ($M^+$) and an anion ($[(Z^1Y^1)(Z^2Y_2N]^-$), can thus function as a part of the electrolyte salt in the lithium ion secondary battery.

The "M" in the formula (1) is not particularly limited as long as the element is a metal element, examples thereof can include alkali metal elements and alkaline earth metal elements, and above all, "M" is preferably an alkali metal element, thereby making it possible to obtain a high energy density. Examples of the alkali metal element can include lithium (Li), sodium (Na), potassium (K), rubidium (Rb), and cesium (Cs), and above all, lithium (Li) is preferred. The alkali metal element is the same as the alkali metal element constituting the electrode reactant, thereby making it possible to obtain a high energy density. The electrode reactant refers to a substance that is involved in the electrode reaction, which is, for example, lithium in the lithium ion secondary battery. For this reason, in the case of the use in a lithium ion secondary battery, "M" is preferably lithium.

$Z^1$ and $Z^2$ may represent the same group or different groups. The monovalent hydrocarbon group for $Z^1$ and $Z^2$ refers to a generic term for monovalent groups composed of carbon (C) and hydrogen (H), which may be linear, or may be branched with one or more side chains. In addition, the monovalent saturated hydrocarbon group may be a saturated hydrocarbon group including no unsaturated bond, or may be an unsaturated hydrocarbon group including one or more unsaturated bonds. The unsaturated bond refers to one or both of a carbon-carbon double bond ($>C=C<$) and a carbon-carbon triple bond (—C≡C—).

Examples of the monovalent hydrocarbon group can include alkyl groups, alkenyl groups, alkynyl groups, cycloalkyl groups, aryl groups, and groups where two or more of these groups are bonded so as to be monovalent. In other words, the monovalent saturated hydrocarbon group refers to, for example, an alkyl group, a cycloalkyl group, and a group where two or more of these groups are bonded so as to be monovalent. The monovalent unsaturated hydrocarbon group refers to, for example, an alkenyl group, an alkynyl group, an aryl group, a group including one or more of these groups, and a group where two or more of these groups are bonded so as to be monovalent. Examples of the group where two or more of the monovalent hydrocarbon groups are bonded can include a group where an alkyl group and an alkenyl group are bonded, a group where an alkyl group and an alkynyl group are bonded, a group where an alkenyl group and an alkynyl group are bonded, a group where an alkyl group and a cycloalkyl group are bonded, and a group where an alkyl group and an aryl group are bonded. Examples of the group where two or more of the monovalent saturated hydrocarbon groups are bonded can include a group where an alkyl group and a cycloalkyl group are bonded. Examples of the group where two or more of the monovalent unsaturated hydrocarbon groups are bonded can include a group where an alkyl group and an alkenyl group are bonded, and a group where an alkyl group and an alkenyl group are bonded.

Specifically, examples of the alkyl group can include a methyl group ($-CH_3$), an ethyl group ($-C_2H_5$), a propyl group ($-C_3H_7$), an n-butyl group ($-C_4H_8$), and a t-butyl group ($-C(CH_3)_2-CH_3$). Specifically, examples of the alkenyl group can include a vinyl group ($-CH=CH_2$) and an allyl group ($-CH_2-CH=CH_2$). Specifically, examples of the alkynyl group can include an ethynyl group ($-C\equiv CH$). Specifically, examples of the cycloalkyl group can include a cyclopropyl group, a cyclobutyl group, a cyclopentyl group, a cyclohexyl group, a cycloheptyl group, and a cyclooctyl group. Specifically, examples of the aryl group can include a phenyl group and a naphthyl group. Specifically, examples of the group where the two or more are bonded can include a group where a methyl group and an ethynyl group are bonded, a group where a vinyl group and an ethynyl group are bonded, a group where a methyl group and a cyclopropyl group are bonded, and a group where a methyl group and a phenyl group are bonded.

The monovalent fluorinated hydrocarbon group refers to the foregoing monovalent hydrocarbon group where one or more hydrogen groups ($-H$) are substituted with a fluorine group ($-F$). Specifically, examples of the monovalent fluorinated hydrocarbon group can include fluorinated alkyl groups, fluorinated alkenyl groups, fluorinated alkynyl groups, fluorinated cycloalkyl groups, fluorinated aryl groups, and groups where two or more of these groups are bonded so as to be monovalent.

Specifically, examples of the fluorinated alkyl group can include a fluoromethyl group ($-CH_2F$), a difluoromethyl group ($-CHF_2$), a perfluoromethyl group ($-CF_3$), a perfluoroethyl group ($-C_2F_5$), a perfluoropropyl group ($-C_3F_7$), an n-perfluorobutyl group ($-C_4F_8$), and a t-perfluorobutyl group ($-C(CF_3)_2-CF_3$). Specifically, examples of the fluorinated alkenyl group can include a perfluorovinyl group ($-CF=CF_2$) and a perfluoroallyl group ($-CF_2-CF=CF_2$). Specifically, examples of the fluorinated alkynyl group can include a perfluoroethynyl group ($-F\equiv CF$). Specifically, examples of the fluorinated cycloalkyl group can include a perfluorocyclopropyl group, a perfluorocyclobutyl group, a perfluorocyclopentyl group, a perfluorocyclohexyl group, a perfluorocycloheptyl group, and a perfluorocyclooctyl group. Specifically, examples of the fluorinated aryl group can include a perfluorophenyl group and a perfluoronaphthyl group. Among these groups, the fluorinated alkyl group, the fluorinated alkenyl group, the fluorinated alkynyl group, the fluorinated cycloalkyl group, and the fluorinated aryl group are preferably perfluoro groups, more preferably perfluoroalkyl groups. This is because it is possible to easily synthesize the groups, and a synergistic interaction to be described later is easily achieved.

The carbon numbers of the monovalent hydrocarbon group and monovalent fluorinated hydrocarbon group are not particularly limited, but are preferably not excessively large. This is because solubility and compatibility of the first compound are improved. Specifically, the carbon number of the fluorinated alkyl group is preferably 1 to 4. The carbon numbers of the fluorinated alkenyl group and the fluorinated alkynyl group are preferably 2 to 4. The carbon numbers of the fluorinated cycloalkyl group and the fluorinated aryl group are preferably 6 to 12.

In the formula (1), one or both of $Z^1$ and $Z^2$ is any of a fluorine group ($-F$) and a monovalent fluorinated hydrocarbon group. This is because it is possible to easily synthesize the groups, and a synergistic interaction to be described later is easily achieved. Accordingly, when one of $Z^1$ and $Z^2$ is a monovalent hydrocarbon group, the other is any of a fluorine group ($-F$) and a monovalent fluorinated hydrocarbon group. More specifically, $Z^1$ and $Z^2$ are not both monovalent hydrocarbon groups.

In the formula (1), each of $Y^1$ and $Y^2$ is not particularly limited as long as the group is any of a sulfonyl group and a carbonyl group. $Y^1$ and $Y^2$ may represent the same group or different groups.

Specifically, examples of the first compound can include lithium bisfluorosulfonylimide ($LiN(FSO_2)_2$), lithium bistrifluoromethylsulfonylimide ($LiN(CF_3SO_2)_2$), lithium fluorosulfonyl trifluoromethyl sulfonyl imide ($LiN(FSO_2)(CF_3SO_2)$), lithium fluorosulfonyl pentafluoroethylsulfonylimide ($LiN(FSO_2)(C_2F_5SO_2)$), lithium fluorosulfonyl nonafluorobutylsulfonylimide ($LiN(FSO_2)(C_4F_9SO_2)$), lithium fluorosulfonyl phenyl sulfonyl imide ($LiN(FSO_2)(C_6H_5SO_2)$), lithium fluorosulfonyl pentafluorophenyl sulfonyl imide ($LiN(FSO_2)(C_6F_5SO_2)$), and lithium fluorosulfonyl vinyl sulfonyl imide ($LiN(FSO_2)(C_2F_3SO_2)$).

The second compound described above contains one or both of the compounds represented by formula (2-A) and formula (2-B). However, the second compound may contain two or more of the compounds indicated in the formula (2-A) or two or more of the compounds indicated in the formula (2-B).

The compound indicated in the formula (2-A) is a mononitrile compound containing no ether bond (non-oxygen-containing mononitrile compound). $R^1$ is not particularly limited as long as the group is a monovalent hydrocarbon group. Details regarding the monovalent hydrocarbon group are provided as mentioned above. Specifically, examples of the non-oxygen-containing mononitrile compound can include acetonitrile ($CH_3CN$), propionitrile ($C_3H_7CN$), and butyronitrile ($C_4H_9CN$).

The compound indicated in the formula (2-B) is a mononitrile compound containing an ether bond (oxygen-containing mononitrile compound). $R^2$ is not particularly limited as long as the group is a monovalent hydrocarbon group. Details regarding the monovalent hydrocarbon group are provided as mentioned above. For the "X" in the formula (2-B), the divalent hydrocarbon group refers to a generic term for divalent groups composed of carbon and hydrogen, which may be linear, or may be branched with one or more side chains. Specifically, examples of the divalent hydrocarbon group can include alkylene groups, alkenylene groups, alkynylene groups, cycloalkylene groups, arylene groups, and groups where two or more of these groups are bonded so as to be divalent. Specifically, examples of the group where the two or more are bonded can include a group where an alkylene group and an alkenylene group are bonded, a group where an alkyl group and an alkynylene group are bonded, a group where an alkenylene group and an alkynylene group are bonded, a group where an alkylene group and a cycloalkylene group are bonded, and a group where an alkylene group and an arylene group are bonded.

Specifically, examples of the alkylene group can include a methylene group ($-CH_2-$), an ethylene group ($-C_2H_4-$), a propylene group ($-C_3H_6-$), an n-butylene group (—$C_4H_8$—), and a t-butylene group (—$C(CH_3)_2$—$CH_2$—). Specifically, examples of the alkenylene group can include a vinylene group (—CH=CH—) and an allylene group (—$CH_2$—CH=CH—). Specifically, examples of the alkynylene group can include an ethynylene group (—C≡C—). Specifically, examples of the cycloalkylene group can include cyclopropylene, cyclobutylene, cyclopentylene, cyclohexylene, cycloheptylene and cyclooctylene. Specifically, examples of the arylene group can include a phenylene group and a naphthylene group. Specifically, examples of the group where the two or more are bonded can include a group where a methylene group and an ethynylene group are bonded, a group where a vinylene group and an ethynylene group are bonded, a group where a methylene group and a cyclopropylene group are bonded, and a group where a methylene group and a phenylene group are bonded.

The carbon number of the divalent hydrocarbon group is not particularly limited, but is preferably not excessively large. This is because solubility and compatibility of the second compound are improved. Specifically, the carbon number of the alkylene group is preferably 1 to 4. The carbon numbers of the alkenylene group and the alkynylene group are preferably 2 to 4. The carbon numbers of the cycloalkylene group and the arylene group are preferably 6 to 12.

The "X" is not particularly limited as long as the group is a group where one or more ether bonds and one or more divalent hydrocarbon groups are bonded in an arbitrary order. More specifically, the number of ether bonds included in the "X" may be 1, or 2 or more. Similarly, the number of divalent hydrocarbon groups included in the "X" may be 1, or 2 or more. When the number of divalent hydrocarbon groups is 2 or more, the two or more divalent hydrocarbon groups may be the same groups or different groups. The two or more divalent hydrocarbon groups may partially have the same group. Since the order in which the ether bonds and the divalent hydrocarbon groups are bonded may be arbitrary, the ether bonds may be bonded to each other, the divalent hydrocarbon groups may be bonded to each other, and the ether bond may be bonded to the divalent hydrocarbon group.

Above all, the "X" is preferably a group represented by —O—Y— (Y is a divalent hydrocarbon group). This is because it is possible to easily synthesize the groups, and a synergistic interaction to be described later is easily achieved. Details regarding the divalent hydrocarbon group are provided as mentioned above. However, for the X (i.e., —O—Y—) described here, an ether bond (—O—) is bonded to $R^2$, and Y is bonded to a cyano group (—CN). Specifically, examples of the "X" can include —O—$CH_2$—, —$CH_2$—O—, —O—$CH_2$—O—, and —O—$C_2H_5$—.

Specific examples of the oxygen-containing mononitrile compound can include methoxyacetonitrile ($CH_3$—O—$CH_2$—CN), ethoxyacetonitrile ($C_2H_5$—O—$CH_2$—CN), and propoxyacetonitrile ($C_3H_7$—O—$CH_2$—CN).

The content of the second compound in the nonaqueous electrolytic solution is not particularly limited, but preferably 20% by mass to 100% by mass, for example. This is because the synergistic interaction to be described later is easily achieved. When the second compound includes both the non-oxygen-containing mononitrile compound and the oxygen-containing mononitrile compound, the content of the above-mentioned second compound is the sum of: the content of the non-oxygen-containing mononitrile compound; and the content of the oxygen-containing mononitrile compound. The content also means the sum as just described in the subsequent description.

The third compound described above contains any one or more of an unsaturated cyclic carbonate, a halogenated cyclic carbonate, and a polynitrile compound. However, the third compound may contain two or more unsaturated cyclic carbonates. The halogenated cyclic carbonate and the polynitrile compound may also contain two or more as just described.

The unsaturated cyclic carbonate contains any one or more of the compounds indicted in the formula (3-A), the formula (3-B), and the formula (3-C). In this regard, the unsaturated cyclic carbonate refers a cyclic carbonate including one or more unsaturated bonds (carbon-carbon double bonds).

The compound indicated in the formula (3-A) refers to a vinylene carbonate compound. Each of $R^3$ and $R^4$ is not particularly limited as long as the group is any of a hydrogen group and a monovalent hydrocarbon group. Details regarding the monovalent hydrocarbon group are provided as mentioned above. $R^3$ and $R^4$ may represent the same group or different groups.

Specific examples of the vinylene carbonate compound can include vinylene carbonate (1,3-dioxole-2-one), methylvinylene carbonate (4-methyl-1,3-dioxol-2-one), ethylvinylene carbonate (4-ethyl-1,3-dioxole-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one, among which vinylene carbonate is preferred from the viewpoint of being capable of being easily synthesized.

The compound indicated in the formula (3-B) refers to a vinyl ethylene carbonate compound. Each of $R^5$, $R^6$, $R^7$, and $R^8$ is not particularly limited as long as the group is any of a hydrogen group, a monovalent saturated hydrocarbon group, and a monovalent unsaturated hydrocarbon group. Details regarding the monovalent saturated hydrocarbon group and the monovalent unsaturated hydrocarbon group are provided as described above. However, one or more of $R^5$, $R^6$, $R^7$, and $R^8$ represent a monovalent unsaturated hydrocarbon group. This is because the vinyl ethylene carbonate compound has to include one or more unsaturated bonds (carbon-carbon double bond). $R^5$, $R^6$, $R^7$, and $R^8$ may represent the same group or different groups. $R^5$, $R^6$, $R^7$ and $R^8$ may partially have the same group.

Specifically, examples of the vinyl ethylene carbonate compound can include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolan-2-one, 5-methyl-4-vinyl-1,3-dioxolan-2-one, 4,4-divinyl-1,3-dioxolane-2-one, and 4,5-divinyl-1,3-dioxolane-2-one, among which vinylene ethylene carbonate is preferred from the viewpoint of being capable of being easily synthesized.

The compound indicated in the formula (3-C) refers to a methylene ethylene carbonate compound. $R^9$ is not particularly limited as long as the group is a group represented by >$CR^{10}R^{11}$. Details regarding the monovalent hydrocarbon group are provided as mentioned above. $R^{10}$ and $R^{11}$ may represent the same group or different groups.

Specifically, examples of the methylene ethylene carbonate compound can include methylene ethylene carbonate (4-methylene-1,3-dioxolan-2-one), 4,4-dimethyl-5-methylene-1,3-dioxolan-2-one, and 4,4-diethyl-5-methylene-1,3-dioxolane-2-one.

Besides, the unsaturated cyclic carbonate may be a compound containing two methylene groups, or may be catechol carbonate containing a benzene ring, or the like. The compound containing two methylene groups refers to a compound containing >C=CH$_2$ instead of >C=R$^9$ and containing >C=CH$_2$ instead of >CH$_2$ in the formula (3-C).

The content of the unsaturated cyclic carbonate in the nonaqueous electrolytic solution is not particularly limited, but for example, preferably 0.01% by mass to 20% by mass with respect to the total of the whole excluding the unsaturated cyclic carbonate.

The halogenated cyclic carbonate contains any one or more of the compounds indicated in the formula (3-D) and the formula (3-E). The halogenated carbonate ester refers to a carbonate having one or more halogen groups.

The compound indicated in the formula (3-D) refers to a halogenated cyclic carbonate. $R^{12}$ to $R^{15}$ are not particularly limited as long as the groups are any of a hydrogen group, a halogen group, a monovalent hydrocarbon group, and a monovalent halogenated hydrocarbon group. Details regarding the monovalent hydrocarbon group are provided as mentioned above. However, one or more of $R^{12}$ to $R^{15}$ represent any of a halogen group and a monovalent halogenated hydrocarbon group. This is because the halogenated cyclic carbonate has to include one or more halogen groups. $R^{12}$ to $R^{15}$ may represent the same group or different groups. $R^{12}$ to $R^{15}$ may partially have the same group.

The monovalent halogenated hydrocarbon group refers to a group where one or more hydrogen groups are substituted with a halogen group in the monovalent hydrocarbon group mentioned above. The halogen group is not particularly limited, but for example, preferably any of a fluorine group (—F), a chlorine group (—Cl), a bromine group (—Br), and an iodine group (—I), among which the fluorine group (—F) is preferred. This is because it is possible to easily synthesize the groups, and a synergistic interaction to be described later is easily achieved. The number of halogen groups is preferably 2, rather than 1, and further may be 3 or more. This is because a greater effect is obtained.

Specifically, examples of the monovalent halogenated hydrocarbon group can include halogenated alkyl groups, halogenated alkenyl groups, halogenated alkynyl groups, halogenated cycloalkyl groups, halogenated aryl groups, and groups where two or more of these groups are bonded so as to be monovalent.

Among the halogenated alkyl groups, specific examples of the fluorinated alkyl group, the fluorinated alkenyl group, the fluorinated alkynyl group, the fluorinated cycloalkyl group and the fluorinated aryl group are provided as described above. Specific examples of the chlorinated alkyl group, the brominated alkyl group, and the iodinated alkyl group are compounds in which the fluorine groups in the above-mentioned specific examples of the fluorinated alkyl group are changed to chlorine groups, bromine groups, and iodine groups, respectively. Changing the fluorine groups to chlorine groups, bromine groups, or iodine groups as just described also applies to the chlorinated alkenyl group, the chlorinated alkynyl group, the chlorinated cycloalkyl group, the chlorinated aryl group, the brominated alkenyl group, the brominated alkynyl group, the brominated cycloalkyl group, the brominated aryl group, the iodinated alkenyl group, the iodinated alkynyl group, the iodinated cycloalkyl group, and the iodinated aryl group.

Specific examples of the halogenated cyclic carbonate can include 4-fluoro-1,3-dioxolan-2-one, 4-chloro-1,3-dioxolane-2-one, 4,5-difluoro-1,3-dioxolane-2-one, tetrafluoro-1,3-dioxolan-2-one, 4-chloro-5-fluoro-1,3-dioxolane-2-one, 4,5-dichloro-1,3-dioxolane-2-one, tetrachloro-1,3-dioxolan-2-one, 4,5-bistrifluoromethyl-1,3-dioxolane-2-one, 4-trifluoromethyl-1,3-dioxolane-2-one, 4,5-difluoro-4,5-dimethyl-1,3-dioxolane-2-one, 4,4-difluoro-5-methyl-1,3-dioxolane-2-one, 4-ethyl-5,5-difluoro-1,3-dioxolan-2-one, 4-fluoro-5-trifluoromethyl-1,3-dioxolan-2-one, 4-methyl-5-trifluoromethyl-1,3-dioxolan-2-one, 4-fluoro-4,5-dimethyl-1,3-dioxolan-2-one, 5-1,1-difluoroethyl-4,4-difluoro-1,3-dioxolan-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. Specific examples of halogenated cyclic carbonate described herein include isomers (cis isomers and trans isomers).

The compound indicated in the formula (3-E) refers to a halogenated chain carbonate. $R^{16}$ to $R^{21}$ are not particularly limited as long as the groups are any of a hydrogen group, a halogen group, a monovalent hydrocarbon group, and a monovalent halogenated hydrocarbon group. Details regarding the monovalent hydrocarbon group and the monovalent halogenated hydrocarbon group are provided as described above. However, for the same reason as that for the halogenated cyclic carbonate mentioned above, one or more of $R^{16}$ to $R^{21}$ represent any of a halogen group and a monovalent halogenated hydrocarbon group. $R^{16}$ to $R^{21}$ may represent the same group or different groups. $R^{16}$ to $R^{21}$ may partially have the same group. Specifically, examples of the halogenated chain carbonate can include fluoromethyl methyl carbonate, bisfluoromethyl carbonate, and difluoromethyl methyl carbonate. The content of the halogenated chain carbonate in the nonaqueous electrolytic solution is not particularly limited, but for example, preferably 0.01% by mass to 20% by mass with respect to the total of the whole excluding the halogenated chain carbonate.

The polynitrile compound contains any one or more of the compounds indicated in the formula (3-F). The polynitrile compound refers to a compound containing two or more nitrile groups, and the second compound mentioned above is not included in the polynitrile compound described herein. This is because the second compound does not contain two or more nitrile groups.

$R^{22}$ is not particularly limited as long as the group is an n-valent hydrocarbon group. To give an example, when the carbon number of $R^{22}$ is 1, —CH$_2$— and >CH— or the like can be cited respectively as a divalent hydrocarbon group and a trivalent hydrocarbon group. Likewise, when the carbon number of $R^{22}$ is 2, —CH$_2$—CH$_2$— and >CH—CH$_2$— or the like can be cited respectively as a divalent hydrocarbon group and a trivalent hydrocarbon group. Above all, $R^{22}$ is preferably a divalent hydrocarbon group. This is because a synergistic interaction to be described later is easily achieved since the number of cyano groups (—CN) is 2. Details regarding the divalent hydrocarbon group are provided as mentioned above.

Specifically, examples of the polynitrile compound can include malononitrile, succinonitrile, glutaronitrile, adiponitrile, pimelonitrile, suberonitrile, azelanitrile, sebaconitrile, undecanedinitrile, dodecanedinitrile, phthalonitrile, and tetracyanoquinodimethane. The content of the polynitrile compound in the nonaqueous electrolytic solution is not particularly limited, but preferably 0.01% by mass to 10% by mass with respect to the total of the whole excluding the polynitrile compound.

The nonaqueous electrolytic solution may include one or more other materials in addition to the first compound, second compound, and third compound mentioned above. Specifically, examples of the other materials can include any one or more of sulfonates, acid anhydrides, cyclic carboxylates (lactones), dialkyl sulfoxides, chain dicarbonates (see the following formula (10)), aromatic carbonates (see the following formula (11)), cyclic carbonates ((see the following formula (12)), chain monocarboates (see the following formula (13)), chain carboxylates (see the following formula (14)), phosphates (see the following formula (15)), lithium monofluorophosphate ($Li_2PO_3F$), and lithium difluorophosphate ($LiPO_2F_2$).

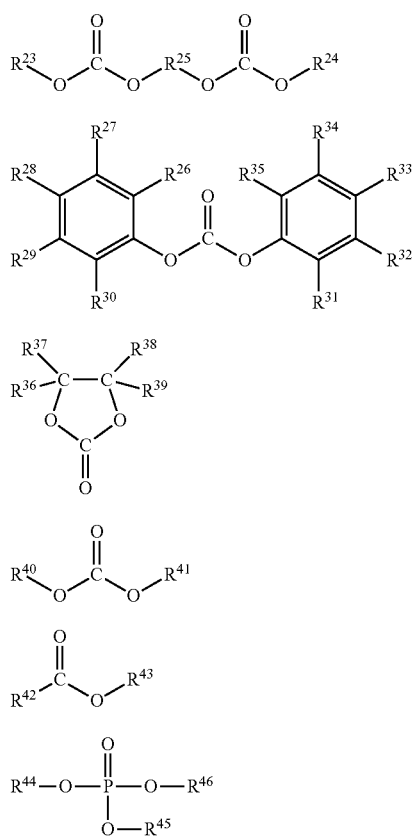

Here, each of $R^{23}$ and $R^{24}$ represents any of a monovalent hydrocarbon group and a monovalent halogenated hydrocarbon group, and $R^{25}$ represents any of a divalent hydrocarbon group and a divalent halogenated hydrocarbon group. In addition, each of $R^{26}$, $R^{27}$, $R^{28}$, $R^{29}$, $R^{30}$, $R^{31}$, $R^{32}$, $R^{33}$, $R^{34}$, and $R^{35}$ represents any of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group where two or more of these groups are bonded so as to be monovalent. Furthermore, each of $R^{36}$, $R^{37}$, $R^{38}$, and $R^{39}$ represents any of a hydrogen group and a monovalent hydrocarbon group. Each of $R^{40}$ and $R^{41}$ represents any of a hydrogen group and a monovalent hydrocarbon group. Furthermore, each of $R^{42}$ and $R^{43}$ represents any of a hydrogen group and a monovalent hydrocarbon group. In addition, each of $R^{44}$, $R^{45}$, and $R^{46}$ represents any of a monovalent hydrocarbon group and a monovalent halogenated hydrocarbon group.

Specifically, examples of the sulfonates can include monosulfonates and disulfonates. The content of the sulfonate in the nonaqueous electrolytic solution is not particularly limited, but for example, preferably 0.01% by mass to 10% by mass with respect to the total of the whole excluding the sulfonate.

The monosulfonate may be a cyclic monosulfonate or a chain monosulfonate. Specifically, examples of the cyclic monosulfonate can include sultone such as propane sultone and propene sultone. Specifically, examples of the chain monosulfonate can include compounds that have a structure with a cyclic monosulfonate broken in the middle. To give an example, $CH_3$—$CH_2$—$CH_2$—$SO_3$—$CH_3$ can be exemplified as a compound with propane sultone broken in the middle. The orientation of —$SO_3$—(—$S(=O)_2$—O—) is not particularly limited. More specifically, the $CH_3$—$CH_2$—$CH_2$—$SO_3$—$CH_3$ may be $CH_3$—$CH_2$—$CH_2$—$S(=O)_2$—O—$CH_3$ or $CH_3$—$CH_2$—$CH_2$—O—$S(=O)_2$—$CH_3$.

The disulfonate may be a cyclic disulfonate or a chain disulfonate. Specifically, examples of the cyclic disulfonate can include compounds represented by the formula (16-1), the formula (16-2), and the formula (16-3). The chain disulfonate refers to a compound with a cyclic disulfonate broken in the middle. Specifically, examples of the compound in which a compound indicated in the formula (16-2) is broken in the middle thereof can include $CH_3$—$SO_3$—$CH_2$—$CH_2$—$SO_3$—$CH_3$. The orientations of the two groups —$SO_3$—(—$S(=O)_2$—O—) are not particularly limited. More specifically, the $CH_3$—$SO_3$—$CH_2$—$CH_2$—$SO_3$—$CH_3$ mentioned above may be $CH_3$—$S(=O)_2$—O—$CH_2$—$CH_2$—$S(=O)_2$—O—$CH_3$, $CH_3$—O—$S(=O)_2$—$CH_2$—$CH_2$—$S(=O)_2$—O—$CH_3$, or $CH_3$—$S(=O)_2$—O—$CH_2$—$CH_2$—O—$S(=O)_2$—$CH_3$.

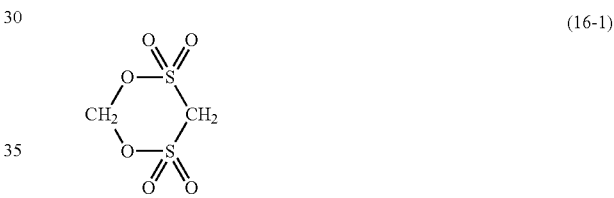

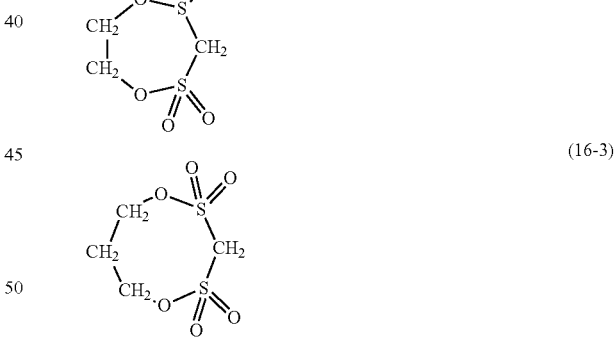

Specific examples of the acid anhydride can include carboxylic anhydrides such as benzoic anhydride, succinic anhydride, glutaric anhydride, and maleic anhydride; disulfonic anhydride such as ethanedisulfonic anhydride and propanedisulfonic anhydride; and carboxylic sulfonic anhydrides such as sulfobenzoic anhydride, sulfopropionic anhydride, and sulfobutyric anhydride. The content of the acid anhydride in the nonaqueous electrolytic solution is not particularly limited, but preferably 0.01% by mass to 10% by mass with respect to the total of the whole excluding the acid anhydride.

Specifically, examples of the cyclic carboxylate can include γ-butyrolactone and γ-valerolactone. The content of the cyclic carboxylate in the nonaqueous electrolytic solution is not particularly limited, but for example, preferably 0.01% by mass to 10% by mass with respect to the total of the whole excluding the cyclic carboxylate.

Specifically, examples of the dialkyl sulfoxide can include dimethyl sulfoxide (($CH_3$)$_2$SO) and diethyl sulfoxide (($C_2H_5$)$_2$SO). The content of the dialkyl sulfoxide in the nonaqueous electrolytic solution is not particularly limited, but for example, preferably 0.01% by mass to 10% by mass with respect to the total of the whole excluding the dialkyl sulfoxide.

The chain dicarbonate refers to any one or more of the compounds represented by the above-mentioned formula (10). $R^{23}$ and $R^{24}$ are not particularly limited as long as the groups are any of a monovalent hydrocarbon group and a monovalent halogenated hydrocarbon group. $R^{23}$ and $R^{24}$ may represent the same group or different groups. $R^{25}$ is not particularly limited as long as the group is any of a divalent hydrocarbon group and a divalent halogenated hydrocarbon group. Details regarding the monovalent hydrocarbon group and the monovalent halogenated hydrocarbon group are provided as described above. The divalent halogenated hydrocarbon group refers to a group where one or more hydrogen groups of a divalent hydrocarbon group are substituted with a halogen group. Details regarding the divalent hydrocarbon group and the halogen group are provided as mentioned above. Specifically, examples of the divalent halogenated hydrocarbon group can include a perfluoromethylene group (—$CF_2$—), a perfluoroethylene group (—$C_2F_4$—), a perfluoropropylene group (—$C_3F_6$—), an n-perfluorobutylene group (—$C_4F_8$—), and a t-perfluorobutylene group (—C($CF_3$)$_2$—$CF_2$—). Specifically, examples of the chain dicarbonate can include ethane-1,2-diyl dimethyl dicarbonate, ethane-1,2-diylethyl methyl dicarbonate, ethane-1,2-diyl diethyl dicarbonate, dimethyloxy bis ethane-2,1-diyl dicarbonate, ethylmethyloxybisethane-2,1-diyl dicarbonate, and diethyloxybisethane-2,1-diyl dicarbonate. The content of the chain dicarbonate in the nonaqueous electrolytic solution is not particularly limited, but preferably, for example, 0.01% by mass to 10% by mass with respect to the total of the whole excluding the chain dicarbonate.

The aromatic carbonate refers to any one or more of the compounds represented by the above-mentioned formula (11). $R^{26}$ to $R^{35}$ are not particularly limited as long as the groups represent a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, or a group where two or more of these groups are bonded so as to be monovalent. $R^{26}$ to $R^{35}$ may represent the same group or different groups. $R^{26}$ to $R^{35}$ may partially have the same group. Details regarding the monovalent hydrocarbon group and the monovalent halogenated hydrocarbon group are provided as described above.

The monovalent oxygen-containing hydrocarbon group refers to a generic term for monovalent groups composed of carbon, hydrogen, and oxygen, which may be linear, or may be branched with one or more side chains. Specifically, examples of the monovalent oxygen-containing hydrocarbon group can include alkoxy groups, and examples of the alkoxy groups can include a methoxy group (—$OCH_3$), an ethoxy group (—$OC_2H_5$), and a propoxy group (—$OC_3H_7$).

The monovalent nitrogen-containing hydrocarbon group refers to a generic term for monovalent groups composed of carbon, hydrogen, and nitrogen, which may be linear, or may be branched with one or more side chains. Specifically, examples of the monovalent nitrogen-containing hydrocarbon group can include an amino group (—$NH_2$).

The monovalent halogenated oxygen-containing hydrocarbon group refers to a group where one or more hydrogen groups of a monovalent oxygen-containing hydrocarbon group are substituted with a halogen group. Details regarding the monovalent oxygen-containing hydrocarbon group and the halogen group are provided as mentioned above. Specifically, examples of the monovalent halogenated oxygen-containing hydrocarbon group can include a perfluoromethoxy group (—$OCF_3$—) and a perfluoroethoxy group (—$OC_2F_4$—).

The monovalent halogenated nitrogen-containing hydrocarbon group refers to a group where one or more hydrogen groups of a monovalent nitrogen-containing hydrocarbon group are substituted with a halogen group. Details regarding the monovalent nitrogen-containing hydrocarbon group and the halogen group are provided as mentioned above. Specifically, examples of the monovalent halogenated nitrogen-containing hydrocarbon group can include a perfluoroamino group (—$NF_2$) and a perfluoromethylamino group (—$CF_2$—$NF_2$).

Specifically, examples of the group where the two or more are bonded can include a group (alkylalkoxy group) where an alkyl group and an alkoxy group are bonded so as to be monovalent, and a group (alkylamino group) where an alkyl group and an amino group are bonded so as to be monovalent. Specifically, examples of the alkyl alkoxy group can include a methyl methoxy group (—$CH_2$—$OCH_3$). Specifically, examples of the alkylamino group can include a methylamino group (—$CH_2$—$NH_2$).

Specifically, examples of the aromatic carbonate can include diphenyl carbonate, bis 4-methylphenyl carbonate, and bispentafluorophenyl carbonate.

The content of the aromatic carbonate in the nonaqueous electrolytic solution is not particularly limited, but for example, preferably 0.01% by mass to 10% by mass with respect to the total of the whole excluding the aromatic carbonate.

The cyclic carbonate refers to any one or more of the compounds represented by the above-mentioned formula (12). $R^{36}$ to $R^{39}$ are not particularly limited as long as the groups are any of a hydrogen group and a monovalent hydrocarbon group. $R^{36}$ to $R^{39}$ may represent the same group or different groups. $R^{36}$ to $R^{39}$ may partially have the same group. Details regarding the monovalent hydrocarbon group are provided as mentioned above. Specifically, examples of cyclic carbonate can include ethylene carbonate, propylene carbonate, and butylene carbonate. The content of the cyclic carbonate in the nonaqueous electrolytic solution is not particularly limited, but preferably 0.01% by mass to 80% by mass, for example.

The chain monocarbonate refers to any one or more of the compounds represented by the above-mentioned formula (13). $R^{40}$ and $R^{41}$ are not particularly limited as long as the groups are any of a hydrogen group and a monovalent hydrocarbon group. $R^{40}$ and $R^{41}$ may represent the same group or different groups. $R^{40}$ and $R^{41}$ may partially have the same group. Details regarding the monovalent hydrocarbon group are provided as mentioned above. Specifically, examples of the chain monocarbonate can include dimethyl carbonate, diethyl carbonate, methyl ethyl carbonate, and methyl propyl carbonate. The content of the chain monocarbonate in the nonaqueous electrolytic solution is not particularly limited, but preferably 0.01% by mass to 70% by mass, for example.

The chain carboxylate refers to any one or more of the compounds represented by the above-mentioned formula (14). $R^{42}$ and $R^{43}$ are not particularly limited as long as the groups are any of a hydrogen group and a monovalent hydrocarbon group. $R^{42}$ and $R^{43}$ may represent the same group or different groups. Details regarding the monovalent hydrocarbon group are provided as mentioned above. Specifically, examples of chain carboxylate can include methyl acetate, ethyl acetate, methyl propionate, ethyl propionate, methyl butyrate, methyl isobutyrate, methyl trimethylacetate, and ethyl trimethylacetate. The content of the chain carboxylate in the nonaqueous electrolytic solution is not particularly limited, but for example, preferably 0.01% by mass to 50% by mass with respect to the total of the whole excluding the chain carboxylate.

The phosphate refers to any one or more of the compounds represented by the above-mentioned formula (15). $R^{44}$ to $R^{46}$ are not particularly limited as long as the groups are any of a monovalent hydrocarbon group and a monovalent halogenated hydrocarbon group. $R^{44}$ to $R^{46}$ may represent the same group or different groups. $R^{44}$ to $R^{46}$ may partially have the same group. Details regarding the monovalent hydrocarbon group and the monovalent halogenated hydrocarbon group are provided as described above. Specifically, examples of the phosphate can include trimethyl phosphate, triethyl phosphate, trifluoroethyl phosphate, and tripropyl phosphate. The content of the phosphate in the nonaqueous electrolytic solution is not particularly limited, but for example, preferably 0.01% by mass to 50% by mass with respect to the total of the whole excluding the phosphate.

Furthermore, any one or more of solvents such as a nonaqueous solvent (organic solvent) can be cited as the other materials. However, the other materials such as the above-mentioned sulfonates are excluded from the nonaqueous solvent described herein.

Further, for example, any one or more of electrolyte salts such as a lithium salt can be exemplified as the other materials. However, the electrolyte salt may contain a salt other than a lithium salt, for example. The salt other than a lithium salt is, for example, a light metal salt other than a lithium salt.

An explanation will be given below with a lithium salt as a specific example of the electrolyte salt, but the lithium salt may be changed to a salt other than the lithium salt. More specifically, for example, the lithium hexafluorophosphate to be described below may be changed to another light metal salt such as sodium hexafluorophosphate or potassium hexafluorophosphate according to an embodiment of the present disclosure.

Specifically, as the lithium salt, the various kinds of lithium salts described previously can be exemplified, which can provide a reduction in internal resistance. Above all, one or more of lithium hexafluorophosphate ($LiPF_6$), lithium tetrafluoroborate ($LiBF_4$), $LiB(C_6H_5)_4$, LiCl, LiBr, lithium perchlorate ($LiClO_4$), lithium hexafluoroarsenate ($LiAsF_6$), $CH_3SO_3Li$, $CF_3SO_3Li$, and $N(CnF_{2n+1}SO_2)_2Li$ are preferred. This is because the internal resistance is further decreased. In particular, lithium hexafluorophosphate ($LiPF_6$) and lithium tetrafluoroborate ($LiBF_4$) are further preferred, and lithium hexafluorophosphate ($LiPF_6$) is even more preferred.

The electrolyte salt may be any one or more of the compounds represented by formula (17), the formula (18), and the formula (19). $R^{51}$ and $R^{53}$ may represent the same group or different groups. The same also applies to $R^{61}$, $R^{62}$, and $R^{63}$, and to $R^{71}$ and $R^{72}$. Two of $R^{61}$, $R^{62}$, and $R^{63}$ may represent the same group.

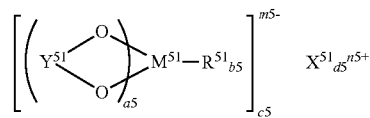

(17)

Here, $X^{51}$ represents any of the Group 1 elements, the Group 2 elements, and Al in the long periodic table. $M^{51}$ represents any one of transition metals and the Group 13 elements, the Group 14 elements, and the Group 15 elements in the long periodic table. $R^{51}$ represents a halogen group. In addition, $Y^{51}$ represents any of $-C(=O)-R^{52}-C(=O)-$, $-C(=O)-CR^{53}{}_2-$, and $-C(=O)-C(=O)-$. However, $R^{52}$ represents any of an alkylene group, a halogenated alkylene group, an arylene group, and a halogenated arylene group, and $R^{53}$ represents any of an alkyl group, a halogenated alkyl group, an aryl group, and a halogenated aryl group. In addition, a5 is an integer of 1 to 4, b5 is any of 0, 2, and 4, and c5, d5, m5, and n5 are integers of 1 to 3.

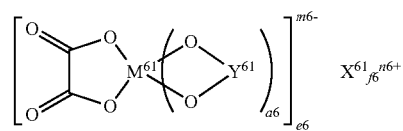

(18)

Here, $X^{61}$ represents any of the Group 1 elements and the Group 2 elements in the long periodic table. $M^{61}$ represents any of transition metals and the Group 13 elements, the Group 14 elements, and the Group 15 element in the long periodic table. $Y^{61}$ represents any of $-C(=O)-(CR^{61}{}_2)_{b6}-C(=O)-$, $-R^{63}{}_2C-(CR^{62}{}_2)_{c6}-C(=O)-$, $-R^{63}{}_2C-(CR^{62}{}_2)_{c6}-CR^{63}{}_2-$, $-R^{63}{}_2C-(CR^{62}{}_2)_{c6}-S(=O)_2-$, $-S(=O)_2-(CR^{62}{}_2)_{d6}-S(=O)_2-$, and $-C(=O)-(CR^{62}{}_2)_{d6}-S(=O)_2-$. However, each of $R^{61}$ and $R^{63}$ represents any of a hydrogen group, an alkyl group, a halogen group, and a halogenated alkyl group. However, $R^{61}$ represents any of a halogen group and a halogenated alkyl group, and $R^{63}$ represents any of a halogen group and a halogenated alkyl group. $R^{62}$ represents any of a hydrogen group, an alkyl group, a halogen group, and a halogenated alkyl group. In addition, a6, e6, and n6 are integers of 1 or 2, b6 and d6 are integers of 1 to 4, c6 is an integer of 0 to 4, and f6 and m6 are integers of 1 to 3.

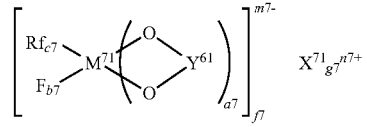

(19)

Here, $X^{71}$ represents any of the Group 1 elements and the Group 2 elements in the long periodic table. $M^{71}$ represents any of transition metals and the Group 13 elements, the Group 14 elements, and the Group 15 elements in the long periodic table. $R_f$ represents any of a fluorinated alkyl group and a fluorinated aryl group, and the carbon numbers of the fluorinated alkyl group and the fluorinated aryl group are 1 to 10. $Y^{71}$ represents any of —C(=O)—$(CR^{71}{}_2)_{d7}$—C(=O)—, —$R^{72}{}_2$C—$(CR^{71}{}_2)_{d7}$—C(=O)—, —$R^{72}{}_2$C—$(CR^{71}{}_2)_{d7}$—$CR^{72}{}_2$—, —$R^{72}{}_2$C—$(CR^{71}{}_2)_{d7}$—S(=O)$_2$—, —S(=O)$_2$—$(CR^{71}{}_2)_{e7}$—S(=O)$_2$—, and —C(=O)—$(CR^{71}{}_2)_{e7}$—S(=O)$_2$—. However, $R^{71}$ represents any of a hydrogen group, an alkyl group, a halogen group, and a halogenated alkyl group, $R^{72}$ represents any of a hydrogen group, an alkyl group, a halogen group, and a halogenated alkyl group, $R^{72}$ is preferably a halogen group or a halogenated alkyl group. In addition, a7, f7 and n7 are integers of 1 or 2, b7, c7, and e7 are integers of 1 to 4, d7 is an integer of 0 to 4, and g7 and m7 are integers of 1 to 3.

The Group 1 elements are hydrogen (H), lithium (Li), sodium (Na), potassium (K), rubidium (Rb), cesium (Cs), and francium (Fr). The Group 2 elements are beryllium (Be), magnesium (Mg), calcium (Ca), strontium (Sr), barium (Ba), and radium (Ra). The Group 13 elements are boron (B), aluminum (Al), gallium (Ga), indium (In), and thallium (Tl). The Group 14 elements are carbon (C), silicon (Si), germanium (Ge), tin (Sn), and lead (Pb). The Group 15 elements are nitrogen (N), phosphorus (P), arsenic (As), antimony (Sb), and bismuth (Bi).

Specifically, examples of the compound represented by the formula (17) can include the compounds represented by the formula (17-1) to the formula (17-6). Specifically, examples of the compound represented by the formula (18) can include the compounds represented by the formula (18-1) to the formula (18-8). Specifically, examples of the compound represented by the formula (19) can include the compound represented by the formula (19-1).

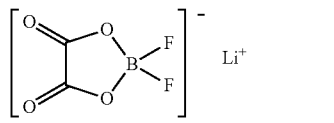

(17-1)

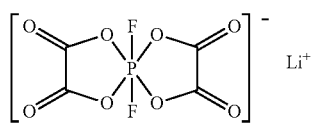

(17-2)

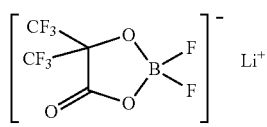

(17-3)

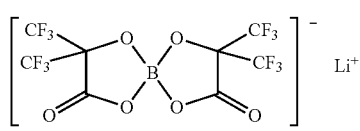

(17-4)

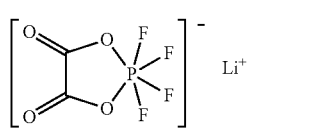

(17-5)

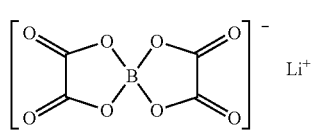

(17-6)

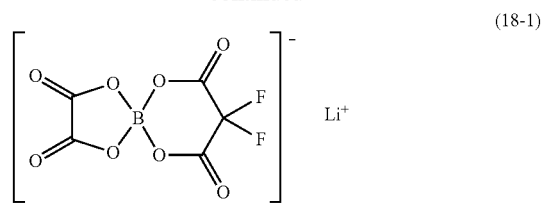

(18-1)

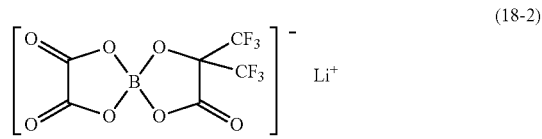

(18-2)

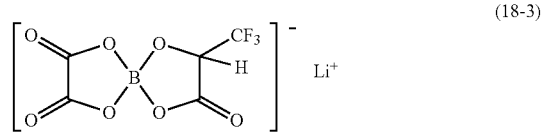

(18-3)

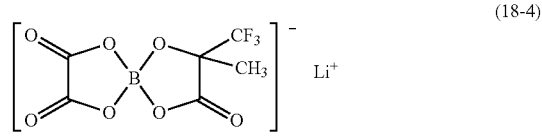

(18-4)

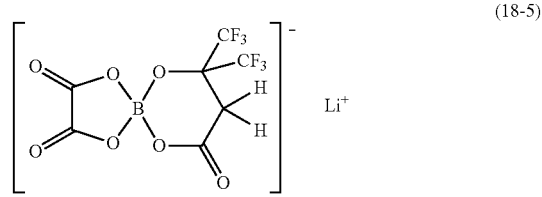

(18-5)

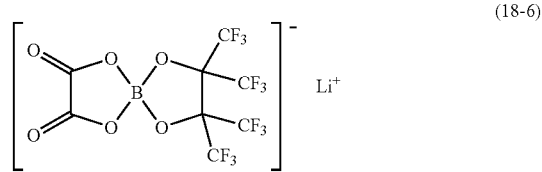

(18-6)

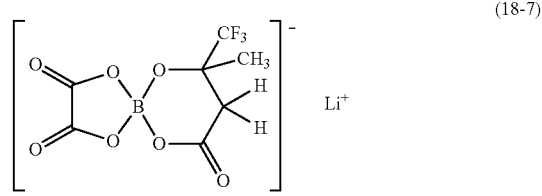

(18-7)

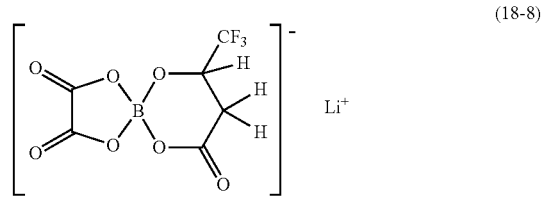

(18-8)

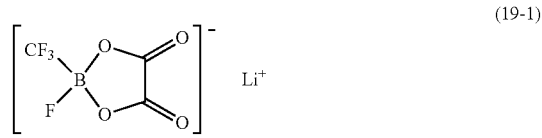

(19-1)

In addition, the compound represented by the formula (20) or the formula (21) can be also exemplified as the electrolyte salt. p, q and r may have the same value or different values. Two of p, q and r may have the same value.

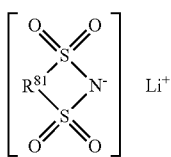

(20)

However, $R^{81}$ represents a linear or branched perfluoroalkylene group having 2 to 4 carbon atoms.

$$LiC(C_pF_{2p+1}SO_2)(C_qF_{2q+1}SO_2)(C_rF_{2r+1}SO_2) \qquad (21),$$

where, p, q and r are integers of 1 or more.

The compound indicated in the formula (20) refers to a cyclic imide compound. Specifically, examples of the cyclic imide compound can include the compounds represented by formula (20-1) to the formula (20-4).

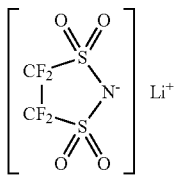

(20-1)

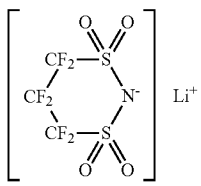

(20-2)

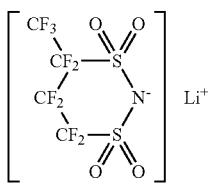

(20-3)

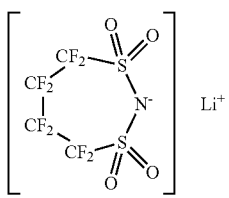

(20-4)

The compound indicated in the formula (21) refers to a chain methide compound. Specifically, examples of the chain methide compound can include lithium tristrifluoromethanesulfonyl methide ($LiC(CF_3SO_2)_3$).

The content of the electrolyte salt is not particularly limited, but preferably 0.3 mol/kg to 3.0 mol/kg with respect to the solvent from the viewpoint of achieving high ionic conductivity. In the case of calculating the content of the electrolyte salt, the amount of the first compound, lithium monofluorophosphate, and lithium difluorophosphate may be included in the amount of the electrolyte salt. In addition, the amount of the second compound, third compound, sulfonate, acid anhydride, cyclic carboxylate, dialkyl sulfoxide, chain dicarbonate, aromatic carbonate, cyclic carbonate, chain monocarbonate, chain carboxylate, and phosphate may be included in the amount of the solvent.

The intrinsic viscosity of the nonaqueous electrolytic solution is not particularly limited, but preferably 10 mPa/s or less at 25° C. from the viewpoint of ensuring the dissociation of the electrolyte salt and ion mobility, and the like.

In particular, when the nonaqueous electrolytic solution includes any one or more of the sulfonate, the acid anhydride, the cyclic carboxylate, the dialkyl sulfoxide, the chain dicarbonate, the aromatic carbonate, the cyclic carbonate, the chain monocarbonate, the chain carboxylate, the phosphate, the lithium monofluorophosphate, and the lithium difluorophosphate, a greater effect can be obtained.

In addition, when the nonaqueous electrolytic solution includes at least one of lithium hexafluorophosphate and lithium tetrafluoroborate, a greater effect can be obtained.

In any of regions (inter-active material regions) between the positive electrode active material included in the positive electrode 22 and the negative electrode active material included in the negative electrode 24, an insulating material may be provided. The location where the insulating material is disposed is not particularly limited as long as the location is any of the inter-active material regions. More specifically, the insulating material may be present in the positive electrode 22 (positive electrode active material layer 22B) or present in the negative electrode 24 (negative electrode active material layer 24B), or present between the positive electrode 22 and the negative electrode 24. To give an example, as to the location where the insulating material is disposed, for example, three types of aspects can be cited as will be described below.

Figure 3B:
FIGS. 3B, 3C, and 3D are respectively a schematic cross-sectional view for explaining a first aspect regarding the disposition of an insulating material, a schematic partial cross-sectional view for explaining a second aspect regarding the disposition of the insulating material, and a schematic partial sectional view for explaining a third aspect regarding the disposition of the insulating material according to an embodiment.

According to the first aspect in an embodiment, as shown in FIG. 3B, the positive electrode active material layer 22B includes a particulate positive electrode active material 211. Further, a layer including an insulating material (an active material insulating layer 212 which is a first insulating layer) is formed on the surface of the positive electrode active material 211. The active material insulating layer 212 may only partially cover the surface of the positive electrode active material 211, or may cover the entire surface thereof. When the active material insulating layer 212 partially covers the surface of the positive electrode active material 211, a plurality of active material insulating layers 212 separated from each other may be present. The active material insulating layer 212 may have a single layer or multiple layers.

The active material insulating layer 212 includes an inorganic insulating material such as insulating ceramics, or an organic insulating material such as insulating polymer compounds, or combinations thereof. Specifically, examples of the insulating ceramics can include aluminum oxide ($Al_2O_3$), silicon oxide ($SiO_2$), magnesium oxide (MgO), titanium oxide ($TiO_2$), and zirconium oxide ($ZrO_2$), and include $LiNbO_3$, LIPON ($Li_{3+y}PO_{4-x}N_x$, where $0.5 \leq x \leq 1$, $-0.3 < y < 0.3$), a material referred to as LISICON (Lithium-Super-Ion-CONductor), Thio-LISICON (for example, $Li_{3.25}Ge_{0.25}P_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$(LATP). The insulating polymer compound may be the same as the material constituting the positive electrode binder or the negative electrode binder, and above all, is preferably a homopolymer of vinylidene fluoride (for example, polyvinylidene fluoride), or a copolymer thereof (for example, a copolymer of vinylidene fluoride and hexafluoropropylene). This is because the homopolymer or the copolymer is excellent in physical strength and electrochemically stable. The monomer subjected to copolymerization with vinylidene fluoride may be a monomer other than hexafluoropropylene.

Figure 3C:
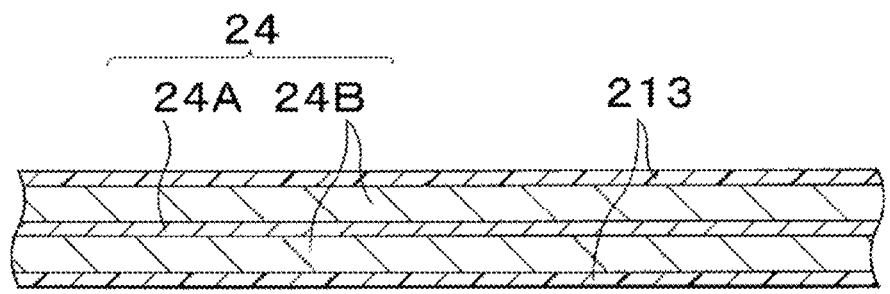

According to the second aspect in an embodiment, as shown in FIG. 3C, a layer including an insulating material (a negative electrode insulating layer 213 which is a second insulating layer) is provided on the surface of the negative electrode 24 (negative electrode active material layer 24B). Details regarding the covering state, layer structure, constituent material, and the like of the negative electrode insulating layer 213 are provided in the same manner as those of the active material insulating layer 212 mentioned above. Further, in this case, in particular, when the negative electrode insulating layer 213 includes an insulating polymer compound, the adhesion of the separator 26 to the negative electrode 24 is improved, thus making the wound electrode body 20 less likely to warp. Then, this inhibits the decomposition reaction of the organic electrolytic solution or nonaqueous electrolytic solution, and also suppresses the leakage of the organic electrolytic solution or nonaqueous electrolytic solution with which the separator 26 is impregnated. Therefore, even in the case of charging/discharging repeated, the resistance is made less likely to be increased, and the lithium ion secondary battery is made less likely to be swollen.

Figure 3D:

According to the third aspect in an embodiment, as shown in FIG. 3D, a layer including an insulating material (a separator insulating layer 214 which is a third insulating layer) is provided on the surface of the separator 26. The separator insulating layer 214 may be provided on a surface of the separator 26 opposed to the positive electrode 22, provided on a surface thereof opposed to the negative electrode 24, or provided on both of the surfaces. Details regarding the covering state, layer structure, constituent material, and the like of the separator insulating layer 214 are provided in the same manner as those of the active material insulating layer 212 mentioned above. Further, in this case, in particular, when the separator insulating layer 214 includes an insulating polymer compound, the adhesion of the separator 26 to the positive electrode 22 and the negative electrode 24 is improved, thus providing the same advantage as in the case of the above-mentioned negative electrode insulating layer 213 including a polymer compound.

The procedure of forming the active material insulating layer 212 on the surface of the positive electrode active material 211 is provided, for example, as follows. It is to be noted that an explanation will be given by taking, as an example, a case where the active material insulating layer 212 includes an insulating ceramic. In the case of forming the active material insulating layer 212, particles of the positive electrode active material 211 and particles of the insulating ceramics are mixed. Then, the mixture is subjected to grinding/mixing with the use of a ball mill, a jet mill, a grinder, a fine powder crusher, or the like. In this case, a dispersion medium such as water or a solvent may be added to the mixture. Thus, the insulating ceramic is deposited on the surface of the positive electrode active material 211, thereby forming the active material insulating layer 212. Besides, the insulating ceramics may be deposited through the use of mechanochemical treatment such as mechanofusion. In addition, the insulating ceramic may be deposited on the surface of the positive electrode active material 211, based on a PVD method such as the sputtering method or a CVD method. Alternatively, a sol-gel method may be used, and in this case, the positive electrode active material 211 may be immersed in an alkoxide solution containing aluminum, silicon or the like, a precursor layer may be deposited on the surface of the positive electrode active material 211, and the precursor layer may be then subjected to firing.

The procedure of forming the negative electrode insulating layer 213 on the surface of the negative electrode active material layer 24B is provided, for example, as follows. It is to be noted that an explanation will be given by taking, as an example, a case where the negative electrode insulating layer 213 includes an insulating ceramic and an insulating polymer compound. In the case of forming the negative electrode insulating layer 213, particles of the insulating ceramic, the insulating polymer compound, and a solvent such as N-methyl-2-pyrrolidone are mixed to disperse the particles of the insulating ceramic in the solvent, and dissolve the insulating polymer compound in the solvent. Then, after immersing the negative electrode 24 in the mixed solution, the negative electrode 24 is taken out of the mixed solution, and dried. Thus, the solvent in the mixed solution is volatilized, and the insulating polymer compound is formed into a film, and the negative electrode insulating layer 213 is thus formed on the surface of the negative electrode active material layer 24B. In this case, the thickness of the negative electrode insulating layer 213 may be adjusted by pressurizing the negative electrode 24 before the drying. Instead of immersing the negative electrode 24 in the mixed solution, the mixed solution may be applied to the surface of the negative electrode active material layer 24B.

Alternatively, in the case of forming the negative electrode insulating layer 213, first, 80 parts by mass of a powdery insulating ceramic and 20 parts by mass of an insulating polymer compound (polyvinylidene fluoride) are mixed, and then the mixture is dispersed in an organic solvent to prepare a treatment solution. Aluminum oxide ($Al_2O_3$) and silicon oxide ($SiO_2$) are used as the powdery insulating ceramic. The average particle diameter $d_{50}$ of the insulating ceramics is adapted to be 0.5 μm. Then, after immersing the negative electrode 24 in the treatment solution, the thickness of the treatment solution supplied to the surface of the negative electrode 24 is adjusted with the use of a gravure roller. Then, the treatment solution is dried at 120° C. with the use of a dryer, thereby volatilizing the organic solvent in the treatment solution. In this way, the negative electrode insulating layer 213 can be formed on the surface of the negative electrode active material layer 24B. The thickness of the negative electrode insulating layer 213 is adapted to be, for example, 5 μm.

The procedure of forming the separator insulating layer 214 on the surface of the separator 26 is configured in the same manner as the procedure of forming the above-mentioned negative electrode insulating layer 213. When the separator insulating layer 214 includes only the insulating polymer compound, the same procedure as in the case where the separator insulating layer 214 includes the insulating ceramic and the insulating polymer compound may be used except that the particles of the insulating ceramic are not used.

Alternatively, in the case of forming the separator insulating layer 214, first, a treatment solution is prepared, based on the same procedure as in the case of preparing the negative electrode insulating layer 213. Then, the separator 26 is immersed in the treatment solution. Then, after pulling up the separator 26 from the treatment solution, the separator 26 is washed with water. Then, the treatment solution supplied to the surface of the separator 26 is dried at 80° C. with hot air to volatilize the organic solvent in the treatment solution. In this manner, the separator insulating layer 214 can be formed on both surfaces of the separator 26. The thickness (total thickness) of the separator insulating layer 214 formed on the both surfaces of the separator 26 is adapted to be, for example, 4.5 μm.

The insulating material is disposed in any of the inter-active material regions, thereby making it possible to achieve a balance between battery characteristics and safety. More specifically, when the insulating material is disposed in the inter-active material region, abnormality such as thermal runaway in the lithium ion secondary battery is less likely to occur, thus improving safety. It is to be noted that such a configuration can be applied to Example 1 to Example 2.

The present technology is described below in further detail according to an embodiment.

[A01]

A negative electrode for a secondary battery, which has a negative electrode active material, where the negative electrode active material includes a mixture of a carbon material, a plurality of first particles, and a plurality of second particles, where the first particles include a first silicon oxide particle, and a carbon layer that covers a surface of the first silicon oxide particle, where the second particles include a carbon particle and a second silicon oxide particle, where the second silicon oxide particle is provided on a surface of the carbon particle or in a layered space inside the carbon particle, or on the surface of the carbon particle and in the layered space inside the carbon particle, where when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

where when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

[A02] the Negative Electrode for a Secondary Battery According to [A01], where the First silicon oxide particle includes $SiO_X$ (where $X \leq 2.5$), and the second silicon oxide particle includes $SiO_Y$ ($Y \leq 2.5$).

[A03] The negative electrode for a secondary battery according to [A01] or [A02], where the particle size of the first silicon oxide particle in the major axis direction is from $1 \times 10^{-6}$ m to $1.5 \times 10^{-5}$ m.

[A04] The negative electrode for a secondary battery according to any one of [A01] to [A03], where the carbon particle of the second particles includes natural graphite.

[A05] The negative electrode for a secondary battery according to [A04], where the particle size of the second silicon oxide particle in the major axis direction is from $3 \times 10^{-8}$ m to $1 \times 10^{-6}$ m, and the particle size of the second particles is from $5 \times 10^{-6}$ m to $5 \times 10^{-5}$ m.

[A06] The negative electrode for a secondary battery according to any one of [A01] to [A03], where the carbon particle of the second particles include non-graphitizable carbon.

[A07] The negative electrode for a secondary battery according to [A06], where the second silicon oxide particle is provided on the surface of the carbon particle of the second particles, where the particle size of the second silicon oxide particle in the major axis direction is from $3 \times 10^{-8}$ m to $1 \times 10^{-6}$ m, and where the particle size of the second particles is from $5 \times 10^{-6}$ m to $5 \times 10^{-5}$ m.

[B01] A lithium ion secondary battery including: a negative electrode including a negative electrode active material;

a positive electrode;

a separator that isolates the negative electrode from the positive electrode; and a nonaqueous electrolytic solution, where the negative electrode active material includes a mixture of a carbon material, a plurality of first particles, and a plurality of second particles, where the first particles include a first silicon oxide particle, and a carbon layer that covers a surface of the first silicon oxide particle, where the second particles include a carbon particle and a second silicon oxide particle, where the second silicon oxide particle is provided on a surface of the carbon particle or in a layered space inside the carbon particle, or on the surface of the carbon particle and in the layered space inside the carbon particle, where when a first mass of the first silicon oxide particles per gram of the negative electrode active material is referred to as $M_1$ gram, and a second mass of the second silicon oxide particle per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

where when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

[B02] A lithium ion secondary battery including: the negative electrode according to any one of [A01] to [A07], which includes a negative electrode active material;

a positive electrode;

a separator that isolates the negative electrode from the positive electrode; and a nonaqueous electrolytic solution.

[C01] The lithium ion secondary battery according to [B01] or [B02], where the electrolyte includes a nonaqueous electrolytic solution, where the nonaqueous electrolytic solution is composed of:

a compound represented by the formula (1);

at least one compound of a compound represented by the formula (2-A) and a compound represented by the formula (2-B); and at least one compound of compounds represented by formulas (3-A) to (3-F), where the content of the compound represented by the formula (1) is 2.5 mol/liter to 6 mol/liter, preferably 3 mol/liter to 6 mol/liter.

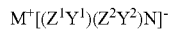
(1)

(2-A)

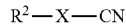
(2-B)

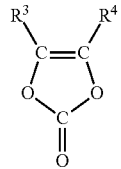
(3-A)

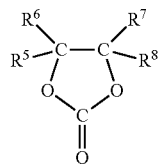
(3-B)

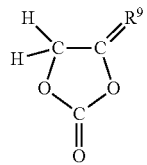
(3-C)

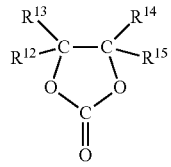
(3-D)

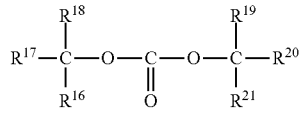
(3-E)

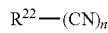
(3-F)

However, in the formula (1), M represents a metal element, each of $Z^1$ and $Z^2$ represents any of a fluorine group, a monovalent hydrocarbon group, and a monovalent fluorinated hydrocarbon group, at least one of $Z^1$ and $Z^2$ represents any of a fluorine group and a monovalent fluorinated hydrocarbon group, and each of $Y^1$ and $Y^2$ represents any of a sulfonyl group and a carbonyl group, in formula (2-A), $R^1$ represents a monovalent hydrocarbon group, in the formula (2-B), $R^2$ represents a monovalent hydrocarbon group, and X represents a group where one or more ether bonds and one or more divalent hydrocarbon groups are bonded in an arbitrary order, in the formula (3-A), each of $R^3$ and $R^4$ represents any of a hydrogen group and a monovalent hydrocarbon group, in the formula (3-B), each of $R^5$, $R^6$, $R^7$, and $R^8$ represents any of a hydrogen group, a monovalent saturated hydrocarbon group, and a monovalent unsaturated hydrocarbon group, and at least one of $R^5$, $R^6$, $R^7$, and $R^8$ represents a monovalent unsaturated hydrocarbon group, in the formula (3-C), $R^9$ represents a group represented by >$CR^{10}R^{11}$, and each of $R^{10}$ and $R^{11}$ represents any of a hydrogen group and a monovalent hydrocarbon group, in the formula (3-D), each of $R^{12}$, $R^{13}$, $R^{14}$, and $R^{15}$ represents any of a hydrogen group, a halogen group, a monovalent hydrocarbon group, and a monovalent halogenated hydrocarbon group, and at least one of $R^{12}$, $R^{13}$, $R^{14}$, and $R^{15}$ represents any of a halogen group and a monovalent halogenated hydrocarbon group, in formula (3-E), each of $R^{16}$, $R^{17}$, $R^{18}$, $R^{19}$, $R^{20}$, and $R^{21}$ represents any of a hydrogen group, a halogen group, a monovalent hydrocarbon group, and a monovalent halogenated hydrocarbon group, and at least one of $R^{16}$, $R^{17}$, $R^{18}$, $R^{19}$, $R^{20}$, and $R^{21}$ represents any of a halogen group and a monovalent halogenated hydrocarbon group, and in the formula (3-F), $R^{22}$ represents a hydrocarbon group that has a valence of n (where n is an integer of 2 or more).

[C02] The lithium ion secondary battery according to [C01], where M represents an alkali metal element, where the monovalent hydrocarbon group is any of an alkyl group, an alkenyl group, an alkynyl group, a cycloalkyl group, an aryl group, and a group where two or more of these groups are bonded to so as to be monovalent, where the monovalent fluorinated hydrocarbon group is a group where at least one hydrogen group in the monovalent hydrocarbon group is substituted with a fluorine group, where the divalent hydrocarbon group is any of an alkylene group, an alkenylene group, an alkynylene group, a cycloalkylene group, an arylene group, and a group where two or more of these groups are bonded, where the monovalent saturated hydrocarbon group is any of an alkyl group, a cycloalkyl group, or a group where these groups are bonded so as to be monovalent, where the monovalent unsaturated hydrocarbon group is any of an alkenyl group, an alkynyl group, an aryl group, a group containing one or more of these groups, and a group where two or more of these groups are bonded so as to be monovalent, where the halogen group is any of a fluorine group, a chlorine group, a bromine group, and an iodine group, and where the monovalent halogenated hydrocarbon group is a group where at least one hydrogen group in the monovalent hydrocarbon group is substituted with a halogen group.

[C03] The lithium ion secondary battery according to [C01] or [C02], where M is lithium, where the monovalent fluorinated hydrocarbon group is a perfluoroalkyl group, and where X represents a group represented by —O—Y— (where Y represents a divalent hydrocarbon group).

[C04] The lithium ion secondary battery according to any one of [C01] to [C03], where the nonaqueous electrolytic solution includes at least one of a sulfonate, an acid anhydride, a cyclic carboxylate, a dialkyl sulfoxide, compounds represented by the formulas (10) to (15), lithium monofluorophosphate, and lithium difluorophosphate.

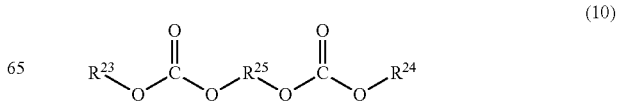
(10)

-continued

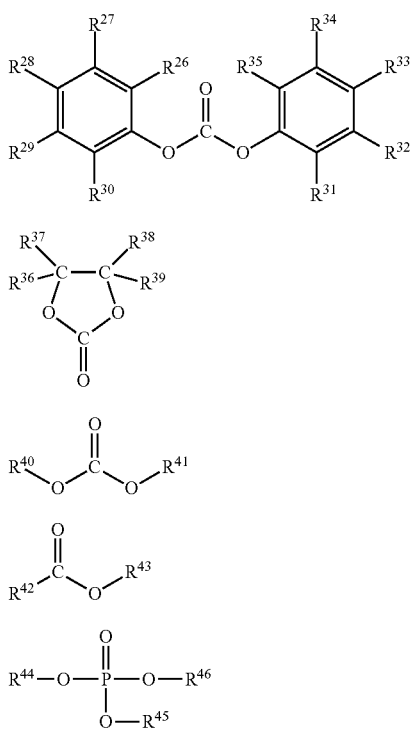

However, each of $R^{23}$ and $R^{24}$ represents any of a monovalent hydrocarbon group and a monovalent halogenated hydrocarbon group, $R^{25}$ represents any of a divalent hydrocarbon group and a divalent halogenated hydrocarbon group, each of $R^{26}$, $R^{27}$, $R^{28}$, $R^{29}$, $R^{30}$, $R^{31}$, $R^{32}$, $R^{33}$, $R^{34}$, and $R^{35}$ represents any of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group where two or more of these groups are bonded so as to be monovalent, each of $R^{36}$, $R^{37}$, $R^{38}$, and $R^{39}$ represents any of a hydrogen group and a monovalent hydrocarbon group, each of $R^{40}$ and $R^{41}$ represents any of a hydrogen group and a monovalent hydrocarbon group, each of $R^{42}$ and $R^{43}$ represents any of a hydrogen group and a monovalent hydrocarbon group, and each of $R^{44}$, $R^{45}$, and $R^{46}$ represents any of a monovalent hydrocarbon group and a monovalent halogenated hydrocarbon group.

[C05] The lithium ion secondary battery according to [C04], where the divalent halogenated hydrocarbon group is a group where at least one hydrogen group in the divalent hydrocarbon group is substituted with a halogen group, where the halogen group is any of a fluorine group, a chlorine group, a bromine group, and an iodine group, where the monovalent oxygen-containing hydrocarbon group is an alkoxy group, where the monovalent nitrogen-containing hydrocarbon group is an alkylamino group, where the monovalent halogenated oxygen-containing hydrocarbon group is a group where at least one hydrogen group in the monovalent oxygen-containing hydrocarbon group is substituted with a halogen group, and where the monovalent halogenated nitrogen-containing hydrocarbon group is a group where at least one hydrogen group in the monovalent nitrogen-containing hydrocarbon group is substituted with a halogen group.

[C06] The lithium ion secondary battery according to any one of [C01] to [C05], where the nonaqueous electrolytic solution contains at least one of lithium hexafluorophosphate and lithium tetrafluoroborate.

[C07] The lithium ion secondary battery according to any one of [C01] to [C06], where the positive electrode includes a positive electrode active material capable of occluding and releasing an electrode reactant, where the negative electrode includes a negative electrode active material capable of occluding and releasing an electrode reactant, where an insulating material is provided between the positive electrode active material and the negative electrode active material, and where the insulating material includes at least one of an insulating ceramic and an insulating polymer compound.

[C08] The lithium ion secondary battery according to [C07], where the insulating ceramic includes at least one of aluminum oxide, silicon oxide, magnesium oxide, titanium oxide, and zirconium oxide, and where the insulating polymer compound includes at least one of a homopolymer and a copolymer of vinylidene fluoride.

[C09] The lithium ion secondary battery according to [C07] or [C08], where a first insulating layer including an insulating material is provided on the surface of the positive electrode active material.

[C10] The lithium ion secondary battery according to [C07] or [C08], where a second insulating layer including an insulating material is provided on the surface of the negative electrode.

[C11] The lithium ion secondary battery according to [C07] or [C08], where a third insulating layer including an insulating material is provided on the surface of the separator.

[D01] A battery pack including: the lithium ion secondary battery according to any one of [B01] to [C11];

a control unit for controlling the operation of the lithium ion secondary battery; and a switch unit for switching the operation of the lithium ion secondary battery in response to an instruction from the control unit.

[D02] An electric vehicle including a battery pack including: the lithium ion secondary battery according to any one of [B01] to [C11];

a conversion unit for converting electric power supplied from the lithium ion secondary battery, to a driving force;

a driving unit for driving in response to the driving force; and a control unit for controlling the operation of the lithium ion secondary battery.

[D03] A power storage system including a battery pack including: the lithium ion secondary battery according to any one of [B01] to [C11];

one or more electric devices supplied with electric power from the lithium ion secondary battery; and a control unit for controlling power supply to the electric devices from the lithium ion secondary battery.

[D04] A power tool including: the lithium ion secondary battery according to any one of [B01] to [C11]; and a movable part supplied with electric power from the lithium ion secondary battery.

[D05] An electronic device including the lithium ion secondary battery according to any one of [B01] to [C11] as a power supply source.

[E01] A negative electrode active material of a negative electrode for a secondary battery, which includes a mixture of a carbon material, a plurality of first particles, and a plurality of second particles, where the first particles include a first silicon oxide particle, and a carbon layer that covers a surface of the first silicon oxide particle, where the second particles include a carbon particle and a second silicon oxide particle, where the second silicon oxide particle is provided on a surface of the carbon particle or in a layered space inside the carbon particle, or on the surface of the carbon particle and in the layered space inside the carbon particle, where when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$0.40 \leq M_1/(M_1+M_2) \leq 0.85$; and $0.15 \leq M_2/(M_1+M_2) \leq 0.60$, and where when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$0.5 \leq Cp_C/(Cp_C+Cp_{SO}) \leq 0.85$; and $0.15 \leq Cp_{SO}/(Cp_C+Cp_{SO}) \leq 0.5$.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode for a secondary battery, comprising a negative electrode active material, wherein the negative electrode active material includes a mixture of a carbon material, a plurality of first particles, and a plurality of second particles, wherein the first particles include a first silicon oxide particle and a carbon layer covering a surface of the first silicon oxide particle, wherein the second particles include a carbon particle and a second silicon oxide particle, wherein when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$0.40 \leq M_1/(M_1+M_2) \leq 0.85$; and $0.15 \leq M_2/(M_1+M_2) \leq 0.60$, and wherein when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$0.5 \leq Cp_C/(Cp_C+Cp_{SO}) \leq 0.85$; and $0.15 \leq Cp_{SO}/(Cp_C+Cp_{SO}) \leq 0.5$.

2. The negative electrode for a secondary battery according to claim 1, wherein the first silicon oxide particle includes $SiO_X$ (where $X \leq 2.5$), and the second silicon oxide particle includes $SiO_Y$ ($Y \leq 2.5$).

3. The negative electrode for a secondary battery according to claim 1, wherein a particle size of the first silicon oxide particle in a major axis direction is from $1 \times 10^{-6}$ m to $1.5 \times 10^{-5}$ m.

4. The negative electrode for a secondary battery according to claim 1, wherein the carbon particle of the second particles includes natural graphite.

5. The negative electrode for a secondary battery according to claim 4, wherein a particle size of the second silicon oxide particle in the major axis direction is from $3 \times 10^{-8}$ m to $1 \times 10^{-6}$ m, and a particle size of the second particles is from $5 \times 10^{-6}$ m to $5 \times 10^{-5}$ m.

6. The negative electrode for a secondary battery according to claim 1, wherein the carbon particle of the second particles includes non-graphitizable carbon.

7. The negative electrode for a secondary battery according to claim 6, wherein the second silicon oxide particle is disposed on a surface of the carbon particle of the second particle, a particle size of the second silicon oxide particle in the major axis direction is from $3 \times 10^{-8}$ m to $1 \times 10^{-6}$ m, and a particle size of the second particles is from $5 \times 10^{-6}$ m to $5 \times 10^{-5}$ m.

8. The negative electrode for a secondary battery according to claim 1, wherein the second silicon oxide particle is provided on a surface of the carbon particle.

9. The negative electrode for a secondary battery according to claim 1, wherein the second silicon oxide particle is provided in a layered space inside the carbon particle.

10. The negative electrode for a secondary battery according to claim 1, wherein the second silicon oxide particle is provided on a surface of the carbon particle and in a layered space inside the carbon particle.

11. The negative electrode for a secondary battery according to claim 1, wherein the carbon particle of the second particles includes spherical carbon material.

12. A lithium ion secondary battery comprising:

a negative electrode including a negative electrode active material;

a positive electrode;

a separator that separates the negative electrode from the positive electrode; and a nonaqueous electrolytic solution, wherein the negative electrode active material includes a mixture of a carbon material, a plurality of first particles, and a plurality of second particles, wherein the first particles include a first silicon oxide particle and a carbon layer covering a surface of the first silicon oxide particle, wherein the second particles include a carbon particle and a second silicon oxide particle, wherein when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

wherein when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

13. The lithium ion secondary battery according to claim 12, wherein the second silicon oxide particle is provided on a surface of the carbon particle.

14. The lithium ion secondary battery according to claim 12, wherein the second silicon oxide particle is provided in a layered space inside the carbon particle.

15. The lithium ion secondary battery according to claim 12, wherein the second silicon oxide particle is provided on a surface of the carbon particle and in a layered space inside the carbon particle.

16. A negative electrode active material comprising:
a mixture of a carbon material, a plurality of first particles, and a plurality of second particles,
wherein the first particles include a first silicon oxide particle and a carbon layer covering a surface of the first silicon oxide particle,
wherein the second particles include a carbon particle and a second silicon oxide particle,
wherein when a first mass of the first silicon oxide particle per gram of the negative electrode active material is referred to as $M_1$ gram, and a second mass of the second silicon oxide particle per gram of the negative electrode active material is referred to as $M_2$ gram, the following is satisfied:

$$0.40 \leq M_1/(M_1+M_2) \leq 0.85; \text{ and}$$

$$0.15 \leq M_2/(M_1+M_2) \leq 0.60, \text{ and}$$

wherein when a first discharge capacity associated with the carbon material and the carbon particle of the second particles is referred to as $Cp_C$, and a second discharge capacity associated with the first silicon oxide particle of the first particles and the second silicon oxide particle of the second particles is referred to as $Cp_{SO}$, the following is satisfied:

$$0.5 \leq Cp_C/(Cp_C+Cp_{SO}) \leq 0.85; \text{ and}$$

$$0.15 \leq Cp_{SO}/(Cp_C+Cp_{SO}) \leq 0.5.$$

* * * * *